US009501052B2

(12) United States Patent
Kohno et al.

(10) Patent No.: US 9,501,052 B2
(45) Date of Patent: Nov. 22, 2016

(54) DIE CUSHION FORCE CONTROL METHOD AND DIE CUSHION APPARATUS

(71) Applicant: AIDA ENGINEERING, LTD., Sagamihara-shi, Kanagawa (JP)

(72) Inventors: Yasuyuki Kohno, Sagamihara (JP); Tadahiro Kondo, Sagamihara (JP); Kazufumi Tsuchida, Sagamihara (JP); Minoru Somukawa, Sagamihara (JP)

(73) Assignee: AIDA ENGINEERING, LTD., Kanagawa (JP)

( * ) Notice: Subject to any disclaimer, the term of this patent is extended or adjusted under 35 U.S.C. 154(b) by 334 days.

(21) Appl. No.: 14/249,964

(22) Filed: Apr. 10, 2014

(65) Prior Publication Data
US 2014/0305177 A1   Oct. 16, 2014

(30) Foreign Application Priority Data

Apr. 11, 2013 (JP) .................. 2013-083157

(51) Int. Cl.
G05B 19/04 (2006.01)
B21D 24/08 (2006.01)
B21D 24/02 (2006.01)

(52) U.S. Cl.
CPC ............. G05B 19/041 (2013.01); B21D 24/02 (2013.01)

(58) Field of Classification Search
CPC .......................... G05B 19/041; B21D 24/02
See application file for complete search history.

(56) References Cited

U.S. PATENT DOCUMENTS

| 5,065,606 A | * | 11/1991 | Kadis | ...................... B21D 22/22 72/348 |
| 5,140,895 A | * | 8/1992 | Imanishi | ................ B21D 24/02 100/269.14 |
| 5,299,444 A | * | 4/1994 | Kirii | ...................... B21D 24/14 100/259 |
| 5,339,665 A | * | 8/1994 | Yoshikawa | ............ B21D 24/02 72/20.1 |
| 5,435,166 A | * | 7/1995 | Sunada | .................. B21D 24/14 72/351 |

(Continued)

FOREIGN PATENT DOCUMENTS

EP     1 736 840 A1   12/2006
JP     2006-122944 A   5/2006

(Continued)

OTHER PUBLICATIONS

Japanese Office Action issued in Japanese Application No. 2013-083157 dated Mar. 10, 2015, with partial English Translation.

(Continued)

Primary Examiner — Ramesh Patel
(74) Attorney, Agent, or Firm — McDermott Will & Emery LLP

(57) ABSTRACT

A die cushion force control method and a die cushion apparatus generates a die cushion force on a cushion pad based on a die cushion force command value set in advance. A die cushion force command value equal to or larger than a target die cushion force command value is outputted initially in order to suppress an initial die cushion force overshoot generated when the target die cushion force command value configured to be stepwise is used as the die cushion force command value, then a die cushion force command value decreased continuously (gradually) so as to be smaller than the target die cushion force command value is outputted, and subsequently a die cushion force command value increasing gradually so as to be equal to the target die cushion force command value is outputted.

14 Claims, 14 Drawing Sheets

(56) References Cited

U.S. PATENT DOCUMENTS

| | | | | |
|---|---|---|---|---|
| 6,085,520 | A * | 7/2000 | Kohno | B30B 1/186 60/414 |
| 7,197,910 | B2 * | 4/2007 | Kodani | B21D 24/02 72/350 |
| 7,739,894 | B2 * | 6/2010 | Suzuki | B21D 24/02 72/453.13 |
| 7,923,956 | B2 * | 4/2011 | Iwashita | B21D 24/02 318/434 |
| 8,468,866 | B2 * | 6/2013 | Miyasaka | B21D 24/02 100/269.02 |
| 8,786,245 | B2 * | 7/2014 | Ueda | G05B 13/041 264/40.3 |
| 2006/0090533 | A1 | 5/2006 | Fujibayashi et al. | |
| 2006/0254337 | A1 * | 11/2006 | Arns | B21D 24/02 72/351 |
| 2009/0007816 | A1 | 1/2009 | Ganapathiappan | |
| 2009/0071218 | A1 * | 3/2009 | Kohno | B21D 24/02 72/351 |
| 2009/0078016 | A1 * | 3/2009 | Suzuki | B21D 24/02 72/20.1 |
| 2009/0158810 | A1 * | 6/2009 | Kohno | B21D 24/02 72/453.13 |
| 2010/0207566 | A1 | 8/2010 | Iwashita et al. | |
| 2011/0045113 | A1 * | 2/2011 | Miyasaka | B21D 24/02 425/145 |
| 2013/0033221 | A1 * | 2/2013 | Ueda | G05B 13/041 318/689 |
| 2014/0260495 | A1 * | 9/2014 | Kohno | B21D 22/20 72/347 |

FOREIGN PATENT DOCUMENTS

| | | |
|---|---|---|
| JP | 2010-005625 A | 1/2010 |
| JP | 2010-188363 A | 9/2010 |
| JP | 2012-115847 A | 6/2012 |
| WO | 02/25240 A1 | 3/2002 |

OTHER PUBLICATIONS

European Search Report issued in European Patent Application No. 14164318.9 dated Jul. 1, 2014.
European Search Report issued in European Application No. 14164318.9-1702 dated Aug. 11, 2014.
Decision of Rejection Japanese Patent Application No. 2013-083157 dated Aug. 7, 2015 with partial English translation.
Notification of Reasons for Refusal Japanese Patent Application No. 2015-200929 dated Aug. 22, 2016 with partial English translation.

* cited by examiner

K1: PROPORTIONALITY FACTOR
ω: ANGULAR NATURAL FREQUENCY OBTAINED BY APPROXIMATING A RESPONSE OF CURRENT AMPLIFIER BY FIRST ORDER DELAY (rad/s)
S: LAPLACE OPERATOR $\omega_p$: NATURAL ANGULAR FREQUENCY OBTAINED BY APPROXIMATING Pref
→P BY SECOND ORDER DELAY (rad/s)
$\zeta_p$: DAMPING RATIO OBTAINED BY APPROXIMATING Pref
→P BY SECOND ORDER DELAY $\omega_p=70,\ \zeta_p=0.45$

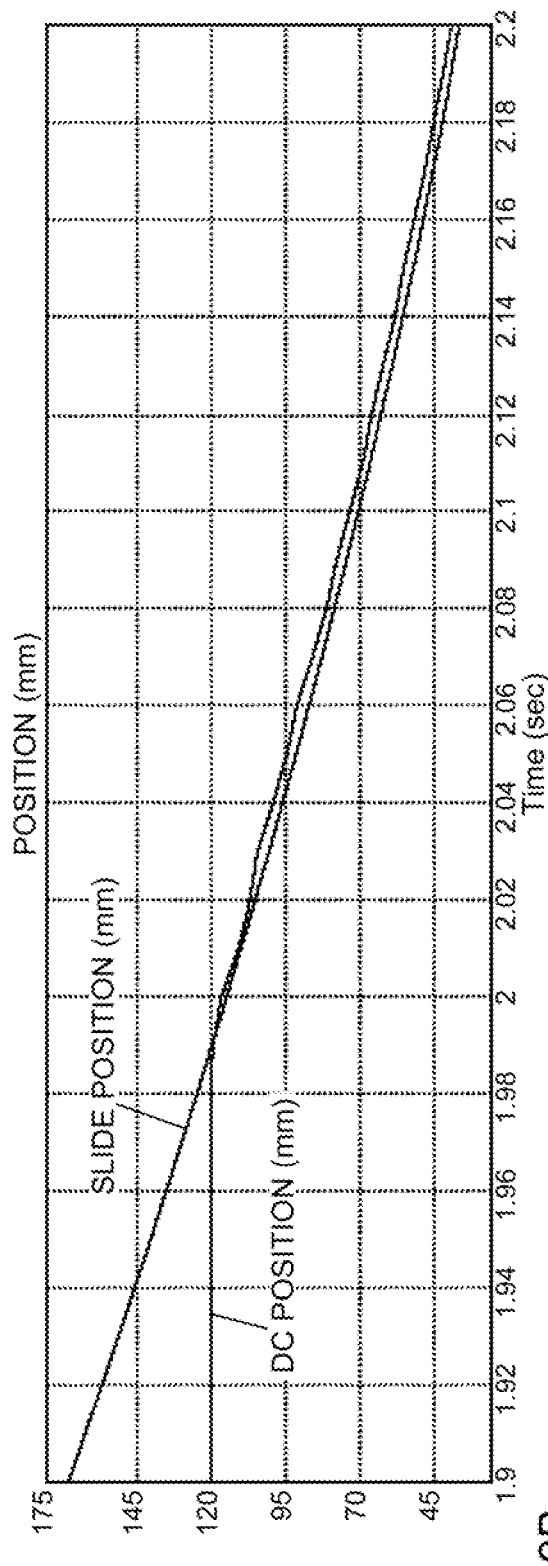
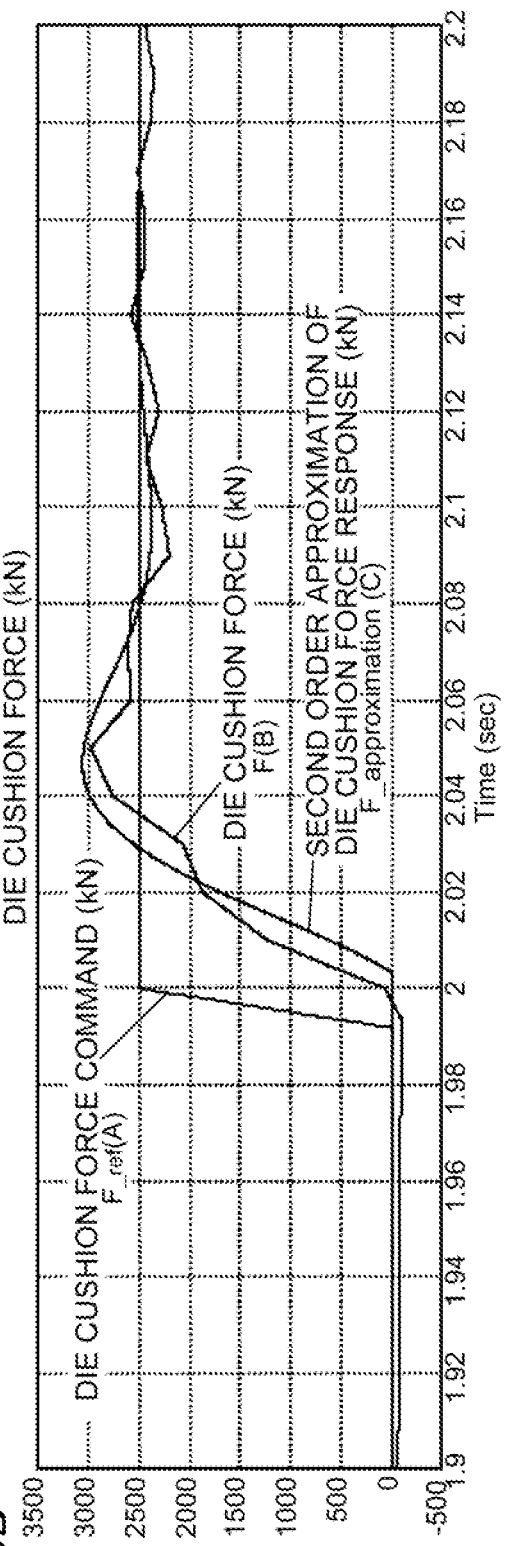
FIG.9A
FIG.9B

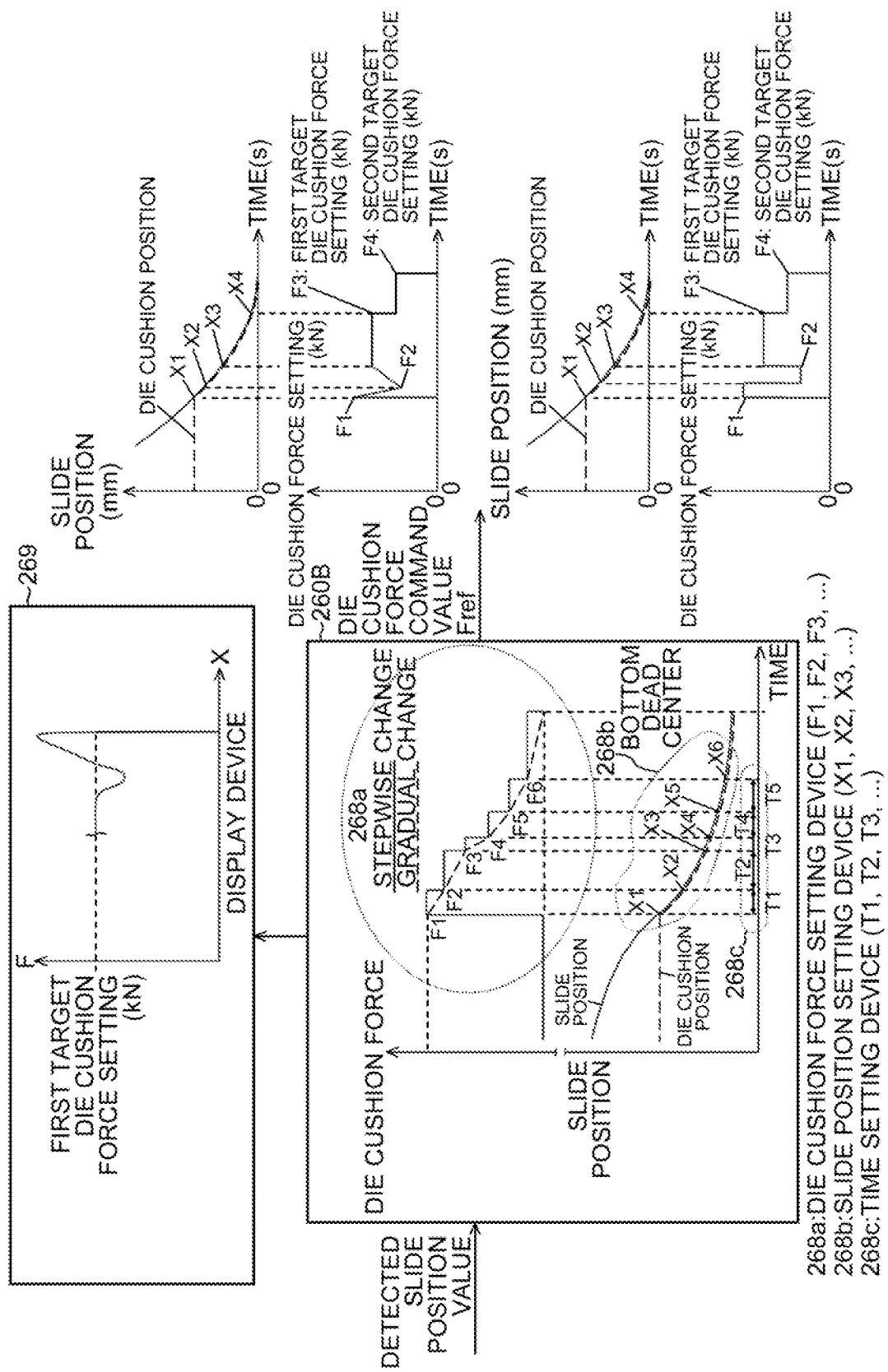

DIE CUSHION FORCE CONTROL METHOD AND DIE CUSHION APPARATUS

BACKGROUND OF THE INVENTION

1. Field of the Invention

The present invention relates to a die cushion force control method and a die cushion apparatus, and more particularly, to a technique for suppressing vibration of die cushion force at the start of die cushion force control.

2. Description of the Related Art

Conventionally, in controlling a die cushion force using a servo die cushion apparatus configured with a servomotor or servo valve, a vibration problem occurs due to excessive response at the point when a slide of a press machine and a cushion pad impact against each other through a die (upper die), a blank, a blank holder, cushion pins, and the like in this order, starting die cushion force control, where the vibration problem lies in that a die cushion force becomes larger (overshoot) or smaller (undershoot) than a die cushion force command value (set force).

It has been considered that the vibration problem occurs depending on performance and load conditions of the die cushion apparatus and in most cases, the vibration problem has been considered to be unavoidable (with resignation). Consequently, there are often such problems as blank breakage caused by overshoot or wrinkles caused by undershoot.

Japanese Patent Laid-Open No. 2010-188363 describes a servo die cushion control apparatus which causes a die cushion force vibrating after an impact between a slide and a cushion pad to converge quickly to a desired value. In order to suppress an undershoot occurring after an initial large overshoot, a next recurring undershoot smaller than the initial undershoot, and the like, the servo die cushion control apparatus is designed to create a second force command value which decreases to a set die cushion force (first force command value) using a force value detected when a local maximum point of the initial overshoot is reached as an initial value and switch the force command value from the first force command value to the second force command value when the local maximum point of the initial overshoot is reached. That is, under conditions in which an overshoot occurs at the time of an impact between the slide and die cushion, responsiveness of the force after the overshoot is improved by switching the force command value around the time of arrival at a local maximum point of the detected force value.

SUMMARY OF THE INVENTION

The invention described in Japanese Patent Laid-Open No. 2010-188363 is not considered to be a rational device of solving the vibration problem. First, this is because the invention described in Japanese Patent Laid-Open No. 2010-188363 is intended to improve responsiveness of the die cushion force after an initial large overshoot occurring after an impact between the slide and die cushion pad and is not effective for a large overshoot which becomes the largest deviation (divergence from the command value) of the die cushion force (the initial large overshoot itself cannot be suppressed).

Second, the idea of generating a second force command at a stage (at the point) when a large overshoot occurs, controlling the die cushion force based on the second force command, and thereby suppressing an undershoot and the like occurring next lacks a concept of dynamic overshoot. That is, even if the force command value is switched from the first force command value to the second force command value at the point when the initial overshoot reaches a local maximum point there is a response delay (dynamic characteristic) between output of the second force command value and generation of a corresponding die cushion force, and thus the die cushion force, which is about to respond to the first force command value (set die cushion force), undershoots energetically with respect to the first force command value in reaction to the initial large overshoot. For the first time at this point, an influence of the second force command value (larger than the first force command value) comes into play, causing a large overshoot again. That is, even if the force command value is switched upon occurrence of the initial overshoot, it is too late and time is still required for convergence.

The present invention has been made in view of the above circumstances and has an object to provide a die cushion force control method and a die cushion apparatus which can easily suppress vibration of a die cushion force, especially an initial large overshoot or undershoot, occurring after an impact between a slide and a cushion pad, at low equipment costs.

To achieve the above object, according to one aspect of the present invention, there is provided a die cushion force control method that outputs a predetermined die cushion force command value and generates a die cushion force on a cushion pad based on the die cushion force command value, the die cushion force control method including: initially outputting a die cushion force command value equal to or larger than a target die cushion force command value in order to suppress an initial die cushion force overshoot generated when the target die cushion force command value configured to be stepwise is used as the die cushion force command value; then outputting a die cushion force command value decreased continuously or stepwise so as to be smaller than the target die cushion force command value; and subsequently outputting a die cushion force command value increasing continuously or stepwise so as to be equal to the target die cushion force command value.

According to the aspect of the present invention, initially (at the time of an impact between a slide of a press machine and a cushion pad of a die cushion apparatus) a die cushion force command value equal to or larger than a target die cushion force command value is outputted. This is intended to cause the die cushion force to rise faster. Then, a die cushion force command value decreased continuously or stepwise so as to be smaller than the target die cushion force command value is outputted in order to suppress an initial overshoot. Also, by suppressing the initial overshoot, an initial undershoot can be suppressed. Subsequently, a die cushion force command value increasing continuously or stepwise so as to be equal to the target die cushion force command value is outputted. That is, instead of giving a conventional stepwise target die cushion force command value, by taking into consideration the response delay between the output of the die cushion force command value and generation of the die cushion force, the die cushion force command value is given ingeniously such that a die cushion force with an ideal response (die cushion force with suppressed vibration of a die cushion force, especially an initial large overshoot or undershoot, occurring after an impact between a slide and a cushion pad) will be available.

According to another aspect of the present invention, the die cushion force control method includes: a step of outputting a first die cushion force command value as the die cushion force command value during a first press working period of a press machine; a step of detecting a first die cushion force generated on the cushion pad controlled based on the outputted first die cushion force command value; a step of computing an inverse characteristic of a response characteristic exhibited in a period between output of the first die cushion force command value and generation of the first die cushion force based on the outputted first die cushion force command value and the detected first die cushion force; a step of setting a second die cushion force with an ideal response represented by a waveform free of any overshoot or undershoot; a step of calculating a second die cushion force command value based on the die cushion force with the ideal response and on the inverse characteristic, and a step of outputting the calculated second die cushion force command value as the die cushion force command value during a second press working period after a lapse of the first press working period of the press machine.

According to the other aspect of the present invention, the inverse characteristic of the response characteristic exhibited in the period between the output of the first die cushion force command value and the generation of the first die cushion force is computed based on the first die cushion force command value outputted during the first press working period of the press machine as well as on the first die cushion force generated in the cushion pad controlled based on the first die cushion force command value. Note that the response characteristic exhibited in the period between output of a die cushion force command value and generation of a die cushion force is constant as long as load conditions are constant and that the inverse characteristic of the response characteristic is also constant. Then, based on the second die cushion force with the ideal response and on the computed inverse characteristic, the second die cushion force command value (an ideal die cushion force command value which provides a die cushion force with an ideal response) used to obtain the second die cushion force with the ideal response is calculated. If the ideal die cushion force command value calculated in this way is given as a command value, overshoots and undershoots of the die cushion force can be suppressed easily at low equipment costs.

According to still another aspect of the present invention, in the die cushion force control method, the step of computing an inverse characteristic includes: a step of identifying the response characteristic exhibited in the period between the output of the first die cushion force command value and the generation of the first die cushion force using a transfer function based on the outputted first die cushion force command value and the detected first die cushion force; and a step of computing an inverse characteristic of the identified transfer function.

According to still another aspect of the present invention, in the die cushion force control method, preferably the second die cushion force with the ideal response approximates the detected first die cushion force and is represented by a waveform free of any overshoot or undershoot contained in the first die cushion force. That is, preferably the second die cushion force with the ideal response has (comparable, realistic) responsiveness in line with a response to a normal die cushion force command value and is represented by a waveform free of any overshoot or undershoot.

According to still another aspect of the present invention, in the die cushion force control method, the first press working period of the press machine is a trial pressing period or a working period made up of one or more press cycles. Trial pressing is always carried out when a new material or die is used in press working and thus the response characteristic can be identified by collecting first die cushion force command values and first die cushion forces outputted during the trial pressing period. Alternatively, by collecting first die cushion force command values and first die cushion forces during a previous working period made up of one or more press cycles, and results produced thereby may be used in calculating a die cushion force command value in a next press cycle.

According to still another aspect of the present invention, there is provided a die cushion apparatus including: a die cushion force generator which supports a cushion pad and generates a die cushion force on the cushion pad: a die cushion force command device which outputs a die cushion force command value; and a die cushion force controller which controls the die cushion force generator to generate the die cushion force corresponding to the die cushion force command value, based on the die cushion force command value outputted from the die cushion force command device, wherein the die cushion force command device initially outputs a die cushion force command value equal to or larger than a target die cushion force command value in order to suppress an initial die cushion force overshoot generated when the target die cushion force command value configured to be stepwise is used as the die cushion force command value, then outputs a die cushion force command value decreased continuously or stepwise so as to be smaller than the target die cushion force command value, and subsequently outputs a die cushion force command value increasing continuously or stepwise so as to be equal to the target die cushion force command value.

According to still another aspect of the present invention, the die cushion apparatus includes: a die cushion force setting device which sets a die cushion force with an ideal response represented by a waveform free of any overshoot or undershoot; and an inverse characteristic setting device which sets an inverse characteristic of a response characteristic exhibited in a period between output of the die cushion force command value and generation of the die cushion force, wherein the die cushion force command device outputs a value computed based on the set die cushion force with an ideal response and on the set inverse characteristic, or outputs an approximate value of the computed value as a die cushion force command value. This makes it possible to output a die cushion force command value used to obtain the die cushion force with an ideal response, by taking into consideration the response characteristic of the apparatus.

According to still another aspect of the present invention, in the die cushion apparatus, preferably the die cushion force command device includes a manually-operated setting device used to manually set a plurality of setting items in order to specify the die cushion force command value, and outputs the die cushion force command value based on the plurality of setting items specified via the manually-operated setting device.

According to still another aspect of the present invention, in the die cushion apparatus, the plurality of setting items set via the manually-operated setting device include a first die cushion force command value equal to or larger than the target die cushion force command value, a second die cushion force command value smaller than the target die cushion force command value, and a third die cushion force command value which represents the target die cushion force command value, and first, second, and third slide positions which represent positions of a slide of a press machine at respective output times of the first, second, and third die cushion force command values, or a first time period during which the die cushion force command value is decreased continuously from the first die cushion force command value to the second die cushion force command value, the first time period beginning at a rise time of the first die cushion force command value and a second time period during which the die cushion force command value is increased continuously from the second die cushion force command value to the third die cushion force command value; and the die cushion force command device outputs a die cushion force command value which changes continuously based on the first, second, and third die cushion force command values, and the first, second, and third slide positions, or the first time period and the second time period from a time of slide impact set via the manually-operated setting device.

According to the still other aspect of the present invention, once the items (the first, second, and third die cushion force command values, and the first, second, and third slide positions, or the first time period and second time period from the time of impact) used to specify the ideal die cushion force command value are set via the manually-operated setting device, the die cushion force command device can output the ideal die cushion force command value (die cushion force command value which changes continuously depending on the slide positions or the time periods from the time of the impact) specified by means of the items set via the manually-operated setting device.

According to still another aspect of the present invention, in the die cushion apparatus, the plurality of setting items set via the manually-operated setting device include a first die cushion force command value equal to or larger than the target die cushion force command value, a second die cushion force command value smaller than the target die cushion force command value, and a third die cushion force command value which represents the target die cushion force command value, and first, second, and third slide positions which represent positions of a slide of a press machine at a rise time of the first die cushion force command value, a fall time of the second die cushion force command value, and a rise time of the third die cushion force command value, respectively, or a first time period which represents an output period of the first die cushion force command value and a second time period which represents an output period of the second die cushion force command value: and the die cushion force command device outputs a die cushion force command value which changes stepwise, based on the first, second, and third die cushion force command values, and the first, second, and third slide positions, or the first time period and the second time period from a time of slide impact set via the manually-operated setting device.

According to the still other aspect of the present invention, once the items (the first, second, and third die cushion force command values, and the first, second, and third slide positions, or the first time period and second time period from the time of impact) used to specify the ideal die cushion force command value are set via the manually-operated setting device, the die cushion force command device can output the ideal die cushion force command value (die cushion force command value which changes incrementally depending on the slide positions or the time periods from the time of the impact) specified by means of the items set via the manually-operated setting device.

According to still another aspect of the present invention, preferably the die cushion apparatus includes: a die cushion force setting device which sets a die cushion force with an ideal response represented by a waveform free of any overshoot or undershoot; an inverse characteristic setting device which sets an inverse characteristic of a response characteristic exhibited in a period between output of the die cushion force command value and generation of the die cushion force; and an output device which outputs a value computed based on the die cushion force with an ideal response set on the die cushion force setting device and the inverse characteristic set on the inverse characteristic setting device, or outputs a waveform or a numeric value which represents an approximate value of the computed value, the output device outputting the computed value or the waveform or numeric value in visible form as a die cushion force command value to be set on the die cushion force command device.

According to the still other aspect of the present invention, since the ideal die cushion force command value is outputted from the output device in visible form, an operator can set plural setting items used to specify the ideal die cushion force command value with reference to the output results using the manually-operated setting device. Note that the ideal die cushion force command value can be calculated based on the die cushion force with an ideal response and on the inverse characteristic of the response characteristic exhibited in the period between the output of the die cushion force command value and the generation of the die cushion force. Also, the output device is, for example, a monitor or printer adapted to display or print a waveform or numerical value which represents the ideal die cushion force command value.

According to still another aspect of the present invention, preferably the die cushion apparatus includes: a die cushion force setting device which sets a die cushion force with an ideal response represented by a waveform free of any overshoot or undershoot; and an inverse characteristic setting device which sets an inverse characteristic of a response characteristic exhibited in a period between output of the die cushion force command value and generation of the die cushion force, and the die cushion force command device outputs a value computed based on the set die cushion force with an ideal response and on the set inverse characteristic, or outputs an approximate value of the computed value as a die cushion force command value.

According to the still other aspect of the present invention, once the die cushion force with an ideal response is set by the die cushion force setting device the die cushion force command device can automatically compute and output an ideal die cushion force command value.

According to still another aspect of the present invention, the die cushion apparatus includes: a target die cushion force setting device which sets a stepwise target die cushion force command value; and a die cushion force generator which generates a die cushion force with an ideal response based on the set target die cushion force command value, wherein the die cushion force with an ideal response generated by the die cushion force generator is set on the die cushion force setting device. When the operator sets a die cushion force (stepwise target die cushion force command value which represents a target die cushion force) similar to a conventional one, a die cushion force with an ideal response is generated based on the set target die cushion force command value, and the die cushion force with an ideal response is set on the die cushion force setting device. Note that once a die cushion force with an ideal response is set in this way, an ideal die cushion force command value used to obtain the die cushion force with the ideal response is computed and outputted.

According to still another aspect of the present invention, preferably the die cushion apparatus includes a die cushion force sensor which detects the die cushion force generated on the cushion pad, based on the die cushion force command value outputted from the die cushion force command device, wherein the die cushion force setting device automatically sets a die cushion force which approximates the die cushion force detected by the die cushion force sensor and which is represented by a waveform free of at least an initial overshoot or undershoot, as a die cushion force with an ideal response. A die cushion force which is a result of response to the die cushion force command value is detected by the die cushion force sensor, and a die cushion force with an ideal response represented by a waveform free of at least an initial overshoot or undershoot is set automatically based on the detection result.

According to still another aspect of the present invention, preferably the die cushion apparatus includes a die cushion force sensor which detects the die cushion force generated on the cushion pad, based on the die cushion force command value outputted from the die cushion force command device; a transfer function measuring device which measures a transfer function which represents the response characteristic exhibited in the period between the output of the die cushion force command value and the generation of the die cushion force, based on the outputted die cushion force command value and the detected die cushion force; and an inverse characteristic calculator which calculates an inverse characteristic of the measured transfer function, wherein the inverse characteristic calculated by the inverse characteristic calculator is automatically set on the inverse characteristic setting device.

With the present invention, since an ideal die cushion force command value is outputted by taking into consideration the response delay between the output of the die cushion force command value and generation of the die cushion force, a die cushion force with an ideal response (die cushion force with suppressed vibration of a die cushion force, especially an initial large overshoot or undershoot, occurring after an impact between a slide and a cushion pad) can be obtained easily by simply contriving the die cushion force command value and the die cushion force with the ideal response can be generated at low equipment costs.

BRIEF DESCRIPTION OF THE DRAWINGS

FIGS. 9A and 9B are waveform charts showing a slide position and die cushion position, and a conventional die cushion force command value, an actual die cushion force response, and a second order approximation of the die cushion force response, respectively;

FIG. 17 is a block diagram showing a second embodiment of the die cushion force command device.

DETAILED DESCRIPTION OF THE PREFERRED EMBODIMENTS

Preferred embodiments of a die cushion force control method and die cushion apparatus according to the present invention will be described in detail below with reference to the accompanying drawings.

[Configuration of Die Cushion Apparatus]

Figure 1:
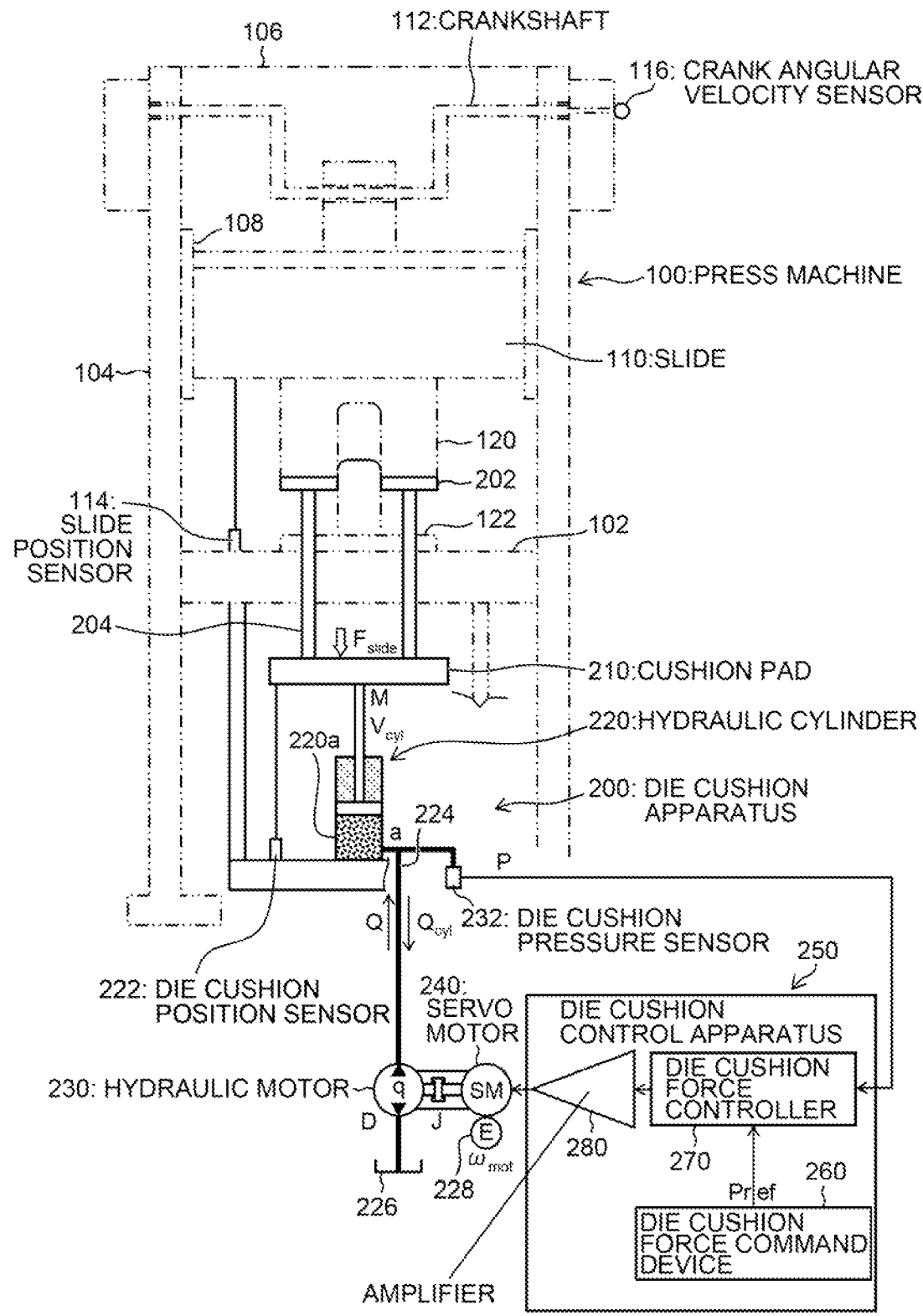
FIG. 1 is a configuration diagram showing an embodiment of a die cushion apparatus according to the present invention.

FIG. 1 is a configuration diagram showing an embodiment of the die cushion apparatus according to the present invention. In FIG. 1, a press machine 100 is indicated by a chain double-dashed line and a die cushion apparatus 200 is indicated by a solid line.

The press machine 100 shown in FIG. 1 includes a bed 102, a column 104, and a crown 106, which make up a frame, as well as includes a slide 110 movably guided in a vertical direction by a guide element 108 installed on the column 104. The slide 110 is moved in an up-and-down direction in FIG. 1 by a crank mechanism including a crankshaft 112 to which a rotational driving force is transmitted by a driving device (not shown).

A slide position sensor 114 adapted to detect a position of the slide 110 is installed on the side of the bed 102 of the press machine 100 while a crank angular velocity sensor 116 adapted to detect an angular velocity of the crankshaft 112 is installed on the crankshaft 112.

An upper die 120 is mounted on the slide 110, and a lower die 122 is mounted (on a bolster) on the bed 102.

A blank holding plate 202 is provided between the upper die 120 and lower die 122. A bottom side of the blank holding plate 202 is supported by a cushion pad 210 via plural cushion pins 204 and a blank is placed (in contact) on a top side.

The die cushion apparatus 200 mainly includes a hydraulic cylinder 220, a hydraulic motor 230, a servomotor 240, and a die cushion control apparatus 250, where the hydraulic cylinder 220 supports the cushion pad 210.

The cushion pad 210 is supported by the hydraulic cylinder 220, and a die cushion position sensor 222 adopted to detect a position of the cushion pad 210 is installed on the cushion pad 210 (or a portion which operates together with a hydraulic cylinder piston).

A pipe 224 connected to a cushion pressure generating-side compression chamber (hereinafter referred to as "a lower chamber") 220a of hydraulic cylinder 220 is connected with a die cushion pressure sensor 232 adapted to detect pressure of the lower chamber 220a as well as with one of discharge ports of the hydraulic motor 230. Another discharge port of the hydraulic motor 230 is connected with a tank 226.

A rotating shaft of the hydraulic motor 230 is connected with a driving shaft of the servomotor 240 directly or via a speed reducer and the servomotor 240 is provided with a motor angular velocity sensor 228 adapted to detect a rotational angular velocity of the servomotor 240.

[Principles of Die Cushion Pressure Control]

A die cushion force can be expressed as the product of pressure in the lower chamber 220a of the hydraulic cylinder 220 and cylinder area, and therefore controlling the die cushion force means controlling the pressure in the lower chamber 220a of the hydraulic cylinder 220.

Now, suppose, a: cross sectional area of hydraulic cylinder on the side on which die cushion pressure is generated,
V: volume of hydraulic cylinder on the side on which die cushion pressure is generated,
P: die cushion pressure,
T: electric (servo) motor torque,
I: moment of inertia of servomotor,
DM: viscous drag coefficient of servomotor,
fM: friction torque of servomotor,
Q: swept volume of hydraulic motor,
$F_{slide}$: force applied to hydraulic cylinder piston rod by slide.
v: pad velocity generated when pad is pushed by press.
M: inertial mass of hydraulic cylinder piston rod plus pad,
DS: viscous drag coefficient of hydraulic cylinder,
fS: frictional force of hydraulic cylinder,
ω: angular velocity of servomotor rotating by being pushed by pressure oil,
K: bulk modulus of hydraulic fluid
k1, k2: proportionality factors
then, static behavior can be expressed by Eqs. (1) and (2).

$$P=\int K((v \cdot A - k1 \cdot Q \cdot \omega)/V)dt \quad (1)$$

$$T=k2 \cdot PQ/(2\pi) \quad (2)$$

Also, dynamic behavior can be expressed by Eqs. (3) and (4) in addition to Eqs. (1) and (2).

$$PA-F=M \cdot dv/dt+DS \cdot v+fS \quad (3)$$

$$T-k2 \cdot PQ/(2\pi)=1 \cdot d\omega/dt+DM \cdot \omega+fM \quad (4)$$

Eqs. (1) to (4) above means that the force transmitted to the hydraulic cylinder 220 from the slide 110 through the cushion pad 210 compresses the lower chamber 220a of the hydraulic cylinder 220, and thereby generates die cushion pressure. At the same time, the hydraulic motor 230 is caused to perform hydraulic motor operation by means of the die cushion pressure, and when rotating shaft torque generated on the hydraulic motor 230 counteracts driving torque of the servomotor 240, the servomotor 240 is rotated (regenerative action) to curb pressure increases. After all, the die cushion pressure depends on the driving torque of the servomotor 240.

[Die Cushion Control Apparatus]

The die cushion control apparatus 250 mainly includes a die cushion force command device 260, a die cushion force controller 270, and an amplifier 280.

The die cushion force controller 270 is supplied with a die cushion force command value (die cushion pressure command value) $P_{ref}$ from the die cushion force command device 260 as well as with a die cushion pressure detection signal indicating a pressure P in the lower chamber 220a of the hydraulic cylinder 220 from the die cushion pressure sensor 232, and the die cushion force controller 270 outputs a torque command value computed based on these input signals to the servomotor 240 via the amplifier 280.

The die cushion control apparatus 250 performs different types of control depending on whether the die cushion control apparatus 250 is in a die cushion position control mode or die cushion force control mode, the die cushion control apparatus 250 being switched to the die cushion position control mode for controlling the position of the cushion pad 210 when the slide 110 is in a non-working region, and switched to the die cushion force control mode when the slide 110 is in a working region, but in the present example, control in the die cushion force control mode will be described as follows.

Also, the die cushion force controller 270 is supplied with an angular velocity signal from the motor angular velocity sensor 228 and a die cushion position detection signal from the die cushion position sensor 222, the angular velocity signal indicating motor angular velocity $\omega_{mot}$ of the servomotor 240 and the die cushion position detection signal indicating the position of the cushion pad 210. These input signals are used to control the die cushion force in the die cushion force control mode.

Furthermore, in the present example, the die cushion force, which is generated by the hydraulic cylinder 220, corresponds to the product of the die cushion pressure P and the cross sectional area a of the lower chamber 220a of the hydraulic cylinder 220. That is, the die cushion force is proportional to the die cushion pressure. The die cushion force command device 260 in the present example outputs the die cushion pressure command value $P_{ref}$, which corresponds to the die cushion force command value. Also, since the pressure P in the lower chamber 220a of the hydraulic cylinder 220 detected by the die cushion pressure sensor 232 corresponds to the die cushion force, the die cushion pressure sensor 232 corresponds to the die cushion force sensor.

Figure 2:
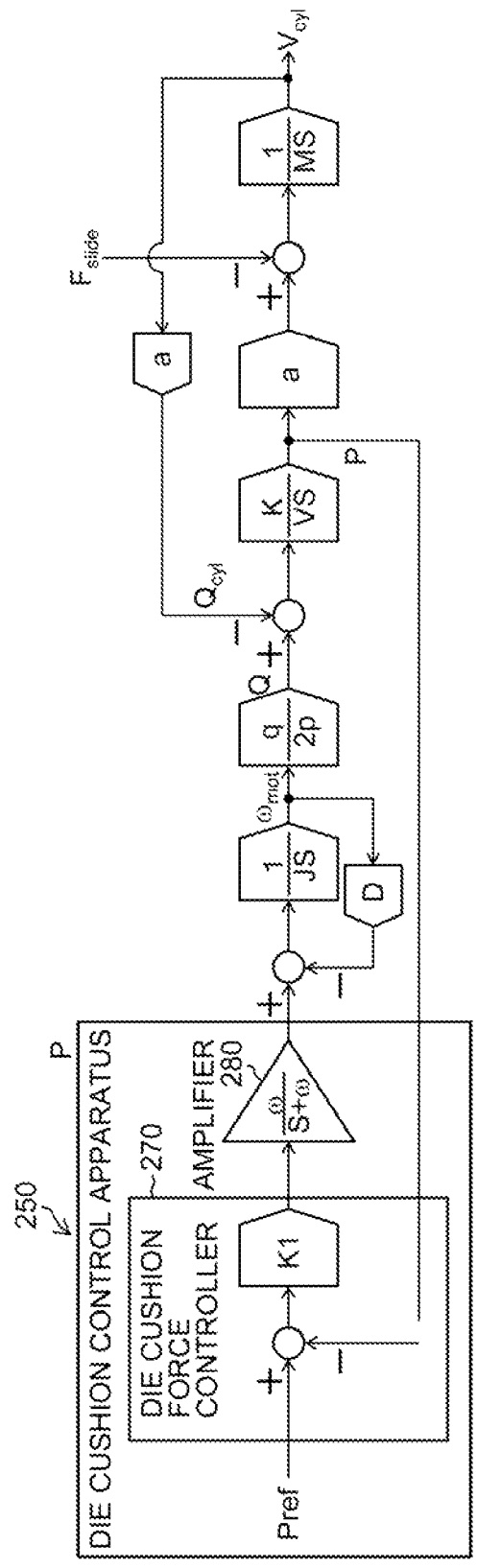
FIG. 2 is a block diagram showing a control element of a die cushion control apparatus shown in FIG. 1.

FIG. 2 is a block diagram showing a main control element, main die cushion apparatus (mechanism) element, and main load element of the die cushion control apparatus 250.

The meanings of the symbols shown in FIGS. 1 and 2 are as follows.

$F_{slide}$: Force received from slide (kN)
P: Die cushion pressure (kPa)
$P_{ref}$: Die cushion pressure command value (kPa)
J: Moment of inertia of servomotor and interlocking parts (kg/m²)
D: Viscosity of servomotor and interlocking parts (kNm/s)
$\omega_{mot}$: Angular velocity of servomotor (rad/s)
q: Swept volume of hydraulic motor (m³/rev)
Q: Quantity of oil discharged by hydraulic motor (m³/s)
$Q_{cyl}$: Swept oil volume of hydraulic cylinder (m³/s)
K: Bulk modulus of hydraulic fluid (kN/m²)
V: Compression volume (m³)
a: Cross sectional area of lower chamber of hydraulic cylinder (m²)

M: Mass of cushion pad and interlocking parts (kg)

$V_{cyl}$: Hydraulic cylinder piston velocity (m/s)

With the die cushion apparatus 200, die cushion pressure is generated in the hydraulic cylinder 220 by power of the slide 110 via the die, blank holding plate 202, cushion pins 204, and cushion pad 210. The pressure (die cushion pressure) is controlled so as to match the die cushion pressure command value by controlling the torque of the servomotor 240 based on the die cushion pressure command value and on the die cushion pressure detection signal produced by the die cushion pressure sensor 232.

That is, the die cushion force command device 260 accepts as input a slide position signal from the slide position sensor 114 to obtain start timing of a die cushion function, and outputs a corresponding die cushion pressure command value ($P_{ref}$) to the die cushion force controller 270 based on the inputted slide position signal. The die cushion force controller 270 accepts as another input a die cushion pressure detection signal indicating the pressure (die cushion pressure) P in the lower chamber 220a of the hydraulic cylinder 220 from the die cushion pressure sensor 232 and outputs a torque command value computed based on these input signals to the servomotor 240 via the amplifier 280.

The angular velocity signal indicating the motor angular velocity $\omega_{mot}$ detected by the motor angular velocity sensor 228 during torque control for the servomotor 240 is used for the purpose of ensuring dynamic stability in die cushion pressure control.

Figure 3A:
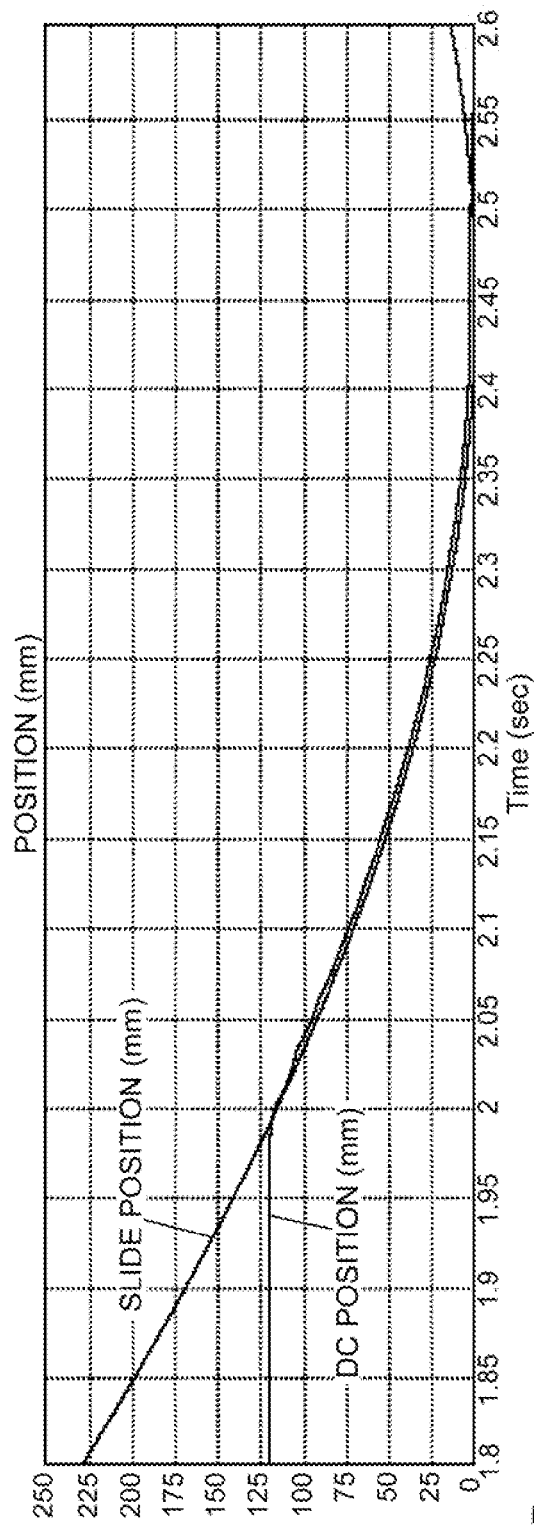
FIGS. 3A and 3B are waveform charts showing a slide position and die cushion position, and a conventional die cushion force command value and die cushion force response, respectively.

FIG. 3 shows a die cushion force control waveform on the die cushion apparatus 200 with the above configuration under conditions: a die cushion force command of 2500 kN, which is always constant, a die cushion stroke of 120 mm, a slide velocity of 500 mm/s at the time of impact between the slide 110 and die cushion (at the start of die cushion force control), and a stationary die cushion position (no downward pre-acceleration) at the time of impact. The results are obtained under relatively transient starting conditions for die cushion force control.

In the present example of control, influences of the slide 110 impacting at 500 mm/s against the die cushion in a state of rest are considered within the bounds of a die cushion force control apparatus (not shown in FIG. 2) with most of the influences being removed for the purpose of control, but are not removed perfectly, and an overshoot of around 20% and undershoot of around 10% occur with respect to the die cushion force command.

<First Embodiment of Die Cushion Force Control Method>

The present invention is intended to solve a vibration problem in which an observed die cushion force becomes larger (overshoot) or smaller (undershoot) than a targeted die cushion force, and especially to suppress an overshoot or undershoot at the start of die cushion force control.

Figure 4:
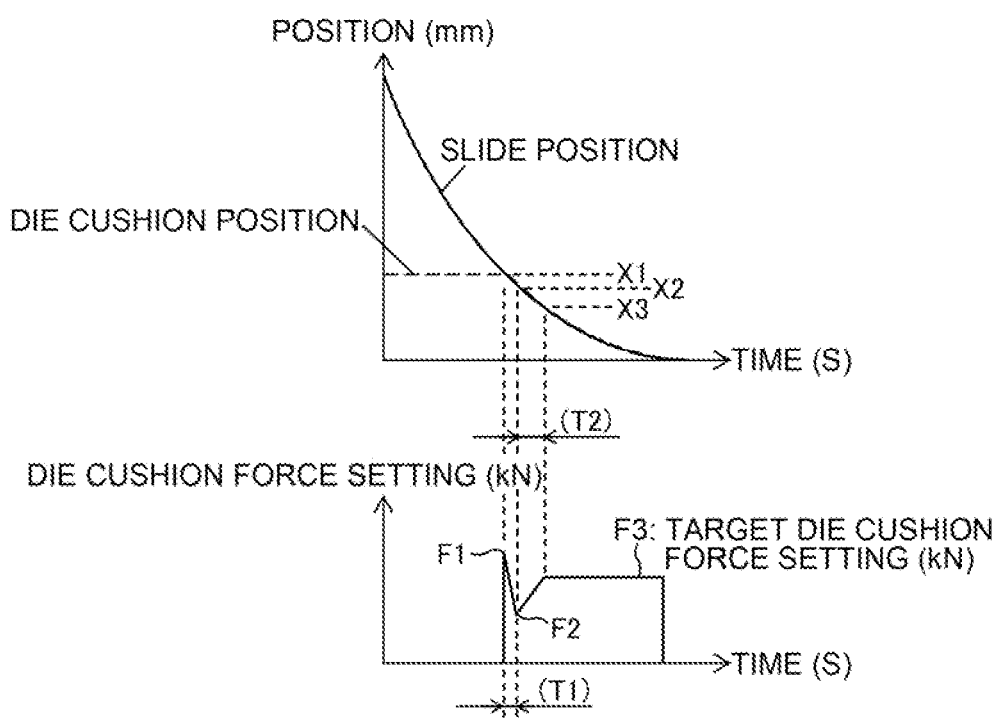
FIG. 4 is a waveform chart showing a die cushion force command value used to describe a first embodiment of a die cushion force control method.

In a first embodiment, only a set value of a die cushion force command was changed as shown in FIG. 4 under same conditions using the same die cushion control apparatus 250.

Regarding the die cushion force command value according to the first embodiment shown in FIG. 4, a die cushion force command value changing continuously (gradually) from a first die cushion force command value F1 to a second die cushion force command value F2 is set between a first slide position X1 (at the time of impact) at the start of die cushion force control and a second slide position X2, then a die cushion force command value changing gradually from the second die cushion force command value F2 to a third die cushion force command value F3 is set between the second slide position X2 and a third slide position X3, and subsequently the third die cushion force command value F3 is set constantly.

Note that since the cushion pad 210 descends in synchronization with the slide 110 after an impact, die cushion positions may be used instead of the slide positions X1 to X3 described above. Also, instead of the slide positions X1 to X3, by setting a time period T1 (first time period) during which the first die cushion force command value F1 is outputted after an impact and a time period T2 (second time period) during which the second die cushion force command value F2 is outputted, the first, second, and third die cushion force command values may be given according to elapsed times after the impact.

Figure 5A:
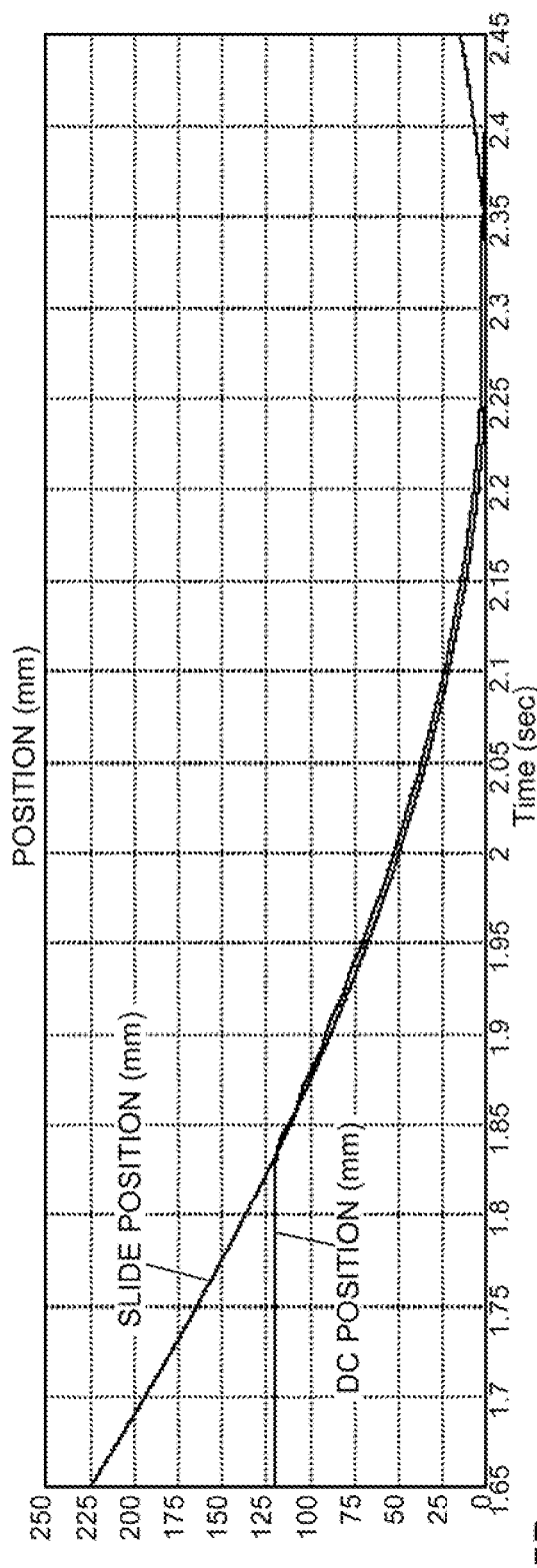
FIGS. 5A and 5B are waveform charts showing a slide position and die cushion position, and a die cushion force command value and die cushion force response according to the first embodiment, respectively.
Figure 5B:
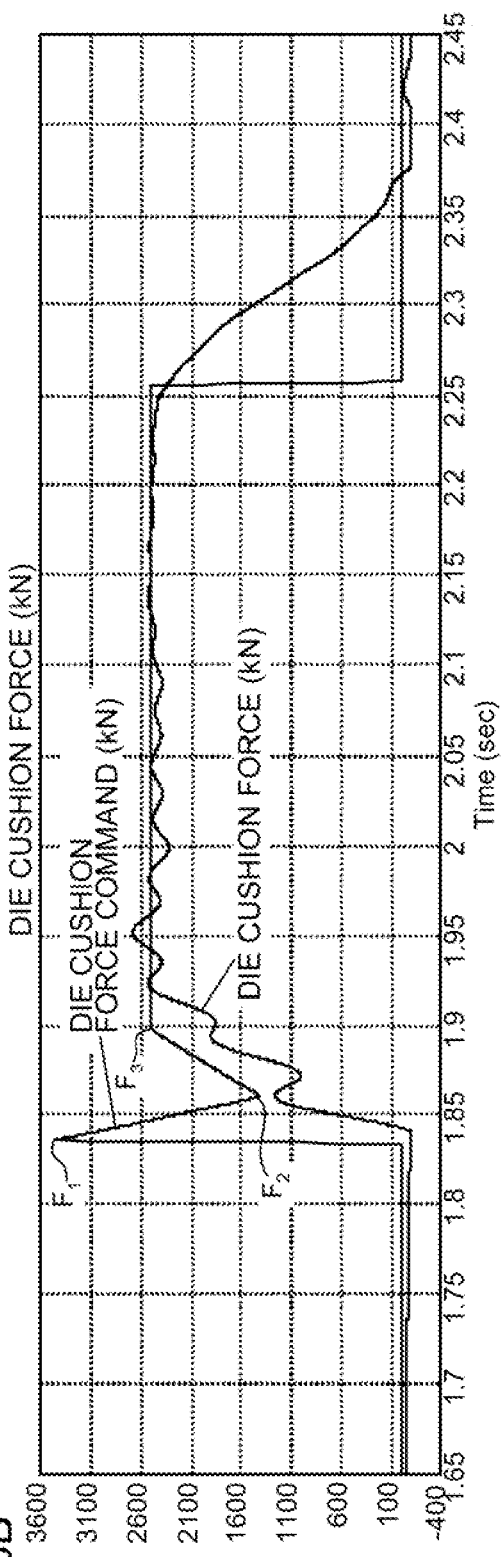

FIG. 5B shows a die cushion force command value which is set as described above and a die cushion force controlled by the die cushion force command value. Also, FIG. 5A shows waveforms which represent a slide position and die cushion position.

Regarding the die cushion force command value shown in FIG. 5B, the first die cushion force command value F1 (3500 kN) is set at the time of impact (slide position: 120 mm), a die cushion force command value changing gradually from the first die cushion force command value F1 (3500 kN) to the second die cushion force command value F2 (1400 kN) is set between the slide position of 120 mm and a slide position of 107 mm, a die cushion force command value changing gradually from the second die cushion force command value F2 (1400 kN) to a third die cushion force command value F3 (2500 kN) is set between the slide position of 107 mm and a slide position of 90 mm, and the third die cushion force command value F3 (2500 kN) is set constantly from the slide position of 90 mm afterward.

By giving die cushion force command values as described above, it is possible to easily suppress vibration including an overshoot and undershoot at the start of die cushion force control without changing a die cushion force control apparatus (see FIG. 5B).

<Second Embodiment of Die Cushion Force Control Method>

Figure 6:
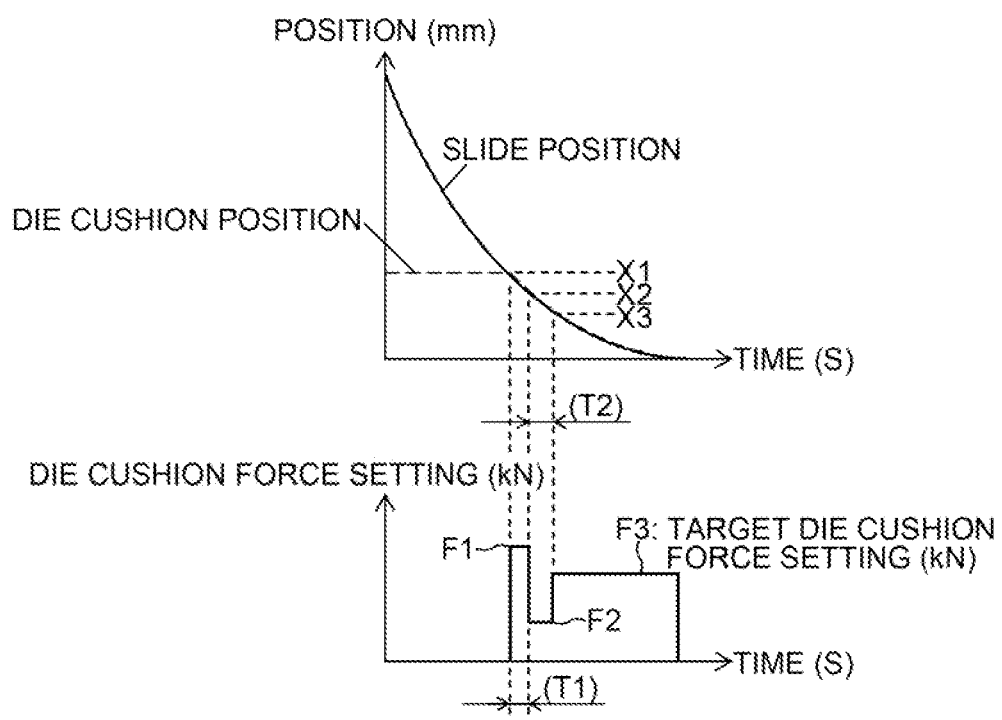
FIG. 6 is a waveform chart showing a die cushion force command value used to describe a second embodiment of the die cushion force control method.

A waveform of a die cushion force command value according to a second embodiment is shown in FIG. 6. The second embodiment differs from the first embodiment in the waveform of the die cushion force command value, and the waveform of the die cushion force command value is more simplified than the first embodiment.

Regarding the die cushion force command value according to the second embodiment shown in FIG. 6, a die cushion force command value (first die cushion force command value F1) larger than a set value of a target die cushion force (third die cushion force command value F3) is set between a first slide position X1 (at the time of impact) at the start of die cushion force control and a second slide position X2, then a die cushion force command value (second die cushion force command value F2) smaller than a target die cushion force command value is set between the second slide position X2 and a third slide position X3, and subsequently a constant value, the third die cushion force command value F3, is established.

Figure 7A:
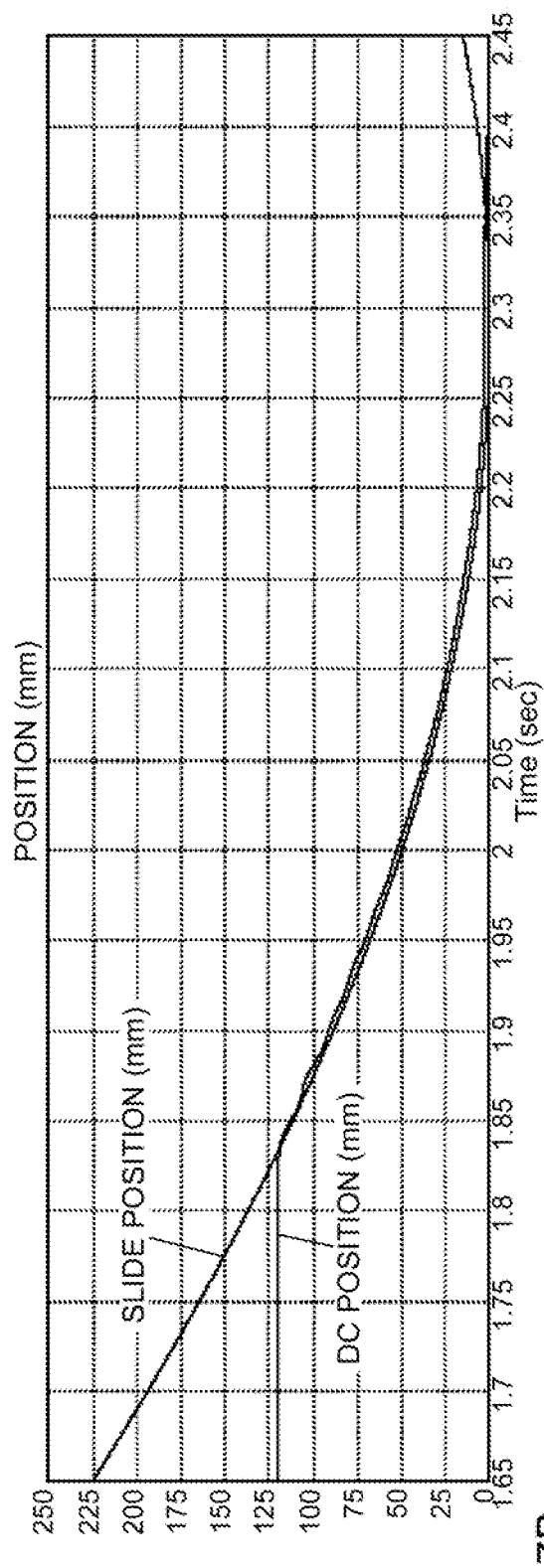
FIGS. 7A and 7B are waveform charts showing a slide position and die cushion position, and a die cushion force command value and die cushion force response according to the second embodiment, respectively.
Figure 7B:
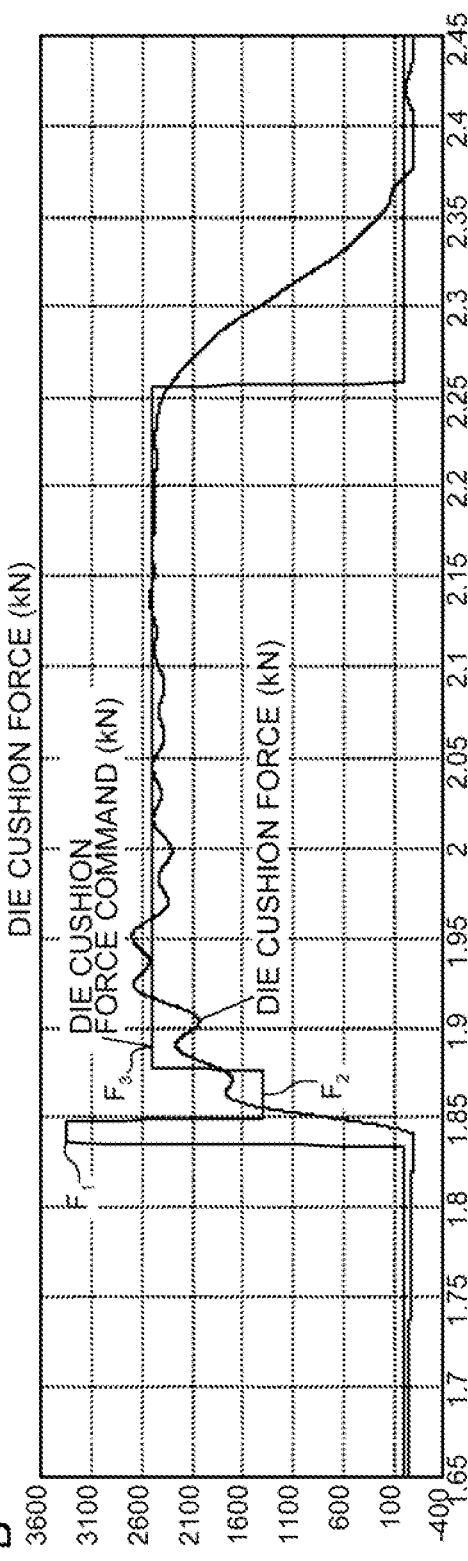

FIG. 7B shows a die cushion force command value which is set as described above and a die cushion force controlled by the die cushion force command value. Also, FIG. 7A shows waveforms which represent a slide position and a die cushion position.

Regarding the die cushion force command value shown in FIG. 7B, the first die cushion force command value F1 (3350 kN) is set between a slide position of 120 mm (at the time of impact) and a slide position of 112 mm, the second die cushion force command value F2 (1400 kN) is set between the slide position of 112 mm and a slide position of 100 mm, and the third die cushion force command value F3 (2500 kN) is set from the slide position of 100 mm afterward.

By giving die cushion force command values as described above, it is possible to easily suppress vibration including an overshoot and undershoot at the start of die cushion force control without changing a die cushion force control apparatus (see FIG. 7B).

[Principles on which Vibration of Die Cushion Force at the Time of Impact is Suppressed]

Next, description will be given of principles on which the vibration of die cushion force at the time of impact is suppressed by die cushion force command values given as described above.

Referring to a block diagram shown in FIG. 2, for example, amplifier responsiveness, which is sufficiently high (in a high-frequency range) compared to a response between the die cushion pressure command value $P_{ref}$ and the die cushion pressure P, is ignored, but an influence of a swept oil volume $Q_{cyl}$ of the hydraulic cylinder on a force $F_{slide}$ transmitted from the slide to the cushion pad as a result of an impact is an important controlling factor and cannot be ignored, and the influence is separately removed using a control algorithm (not shown in FIG. 2). Consequently, a transfer function from the die cushion pressure command value $P_{ref}$ to the die cushion pressure P can be expressed by a second order delay element as shown in FIG. 8.

That is, when rearranged by ignoring the amplifier 280 and the swept oil volume $Q_{cyl}$, the block diagram shown in FIG. 2 can be represented by a transfer function shown in FIG. 8.

Figure 3B:
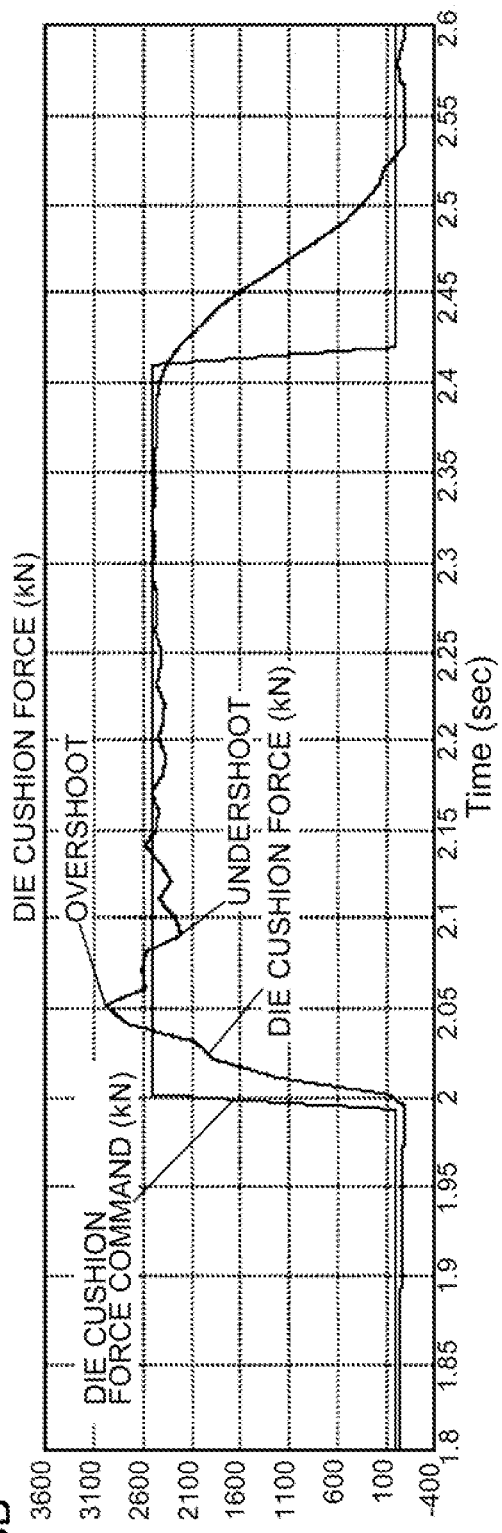
Figure 8A:
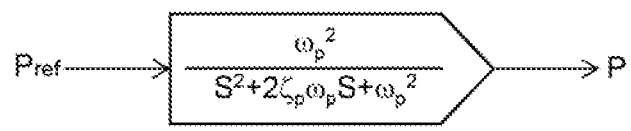
FIGS. 8A and 8B are diagrams showing a transfer function of a second order delay element from a die cushion pressure command to a die cushion pressure, and a transfer function of the identified second order delay element.
Figure 8B:
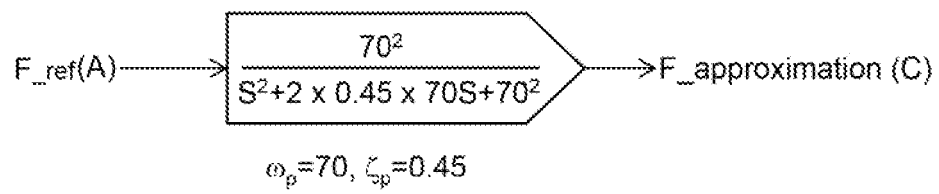

The response of the die cushion force to the die cushion force command (stepwise command) shown in FIG. 3B is expressed as a response of the die cushion force F shown in FIG. 8B when substituted into a transfer function of a second order delay element shown in FIG. 8A.

That is, when a natural angular frequency $\omega_p$ and damping ratio $\zeta_p$ of the transfer function of the second order delay element shown in FIG. 8A are set as $\omega_p$=70 and $\zeta_p$=0.45, respectively, a response waveform becomes a waveform of second order approximation (F_approximation (C)) of the die cushion force response shown in FIG. 9B, and approximates a waveform of an actual response F (B). Note that since the damping ratio $\zeta_p$ is relatively small, the waveform becomes vibratory.

Figure 10:
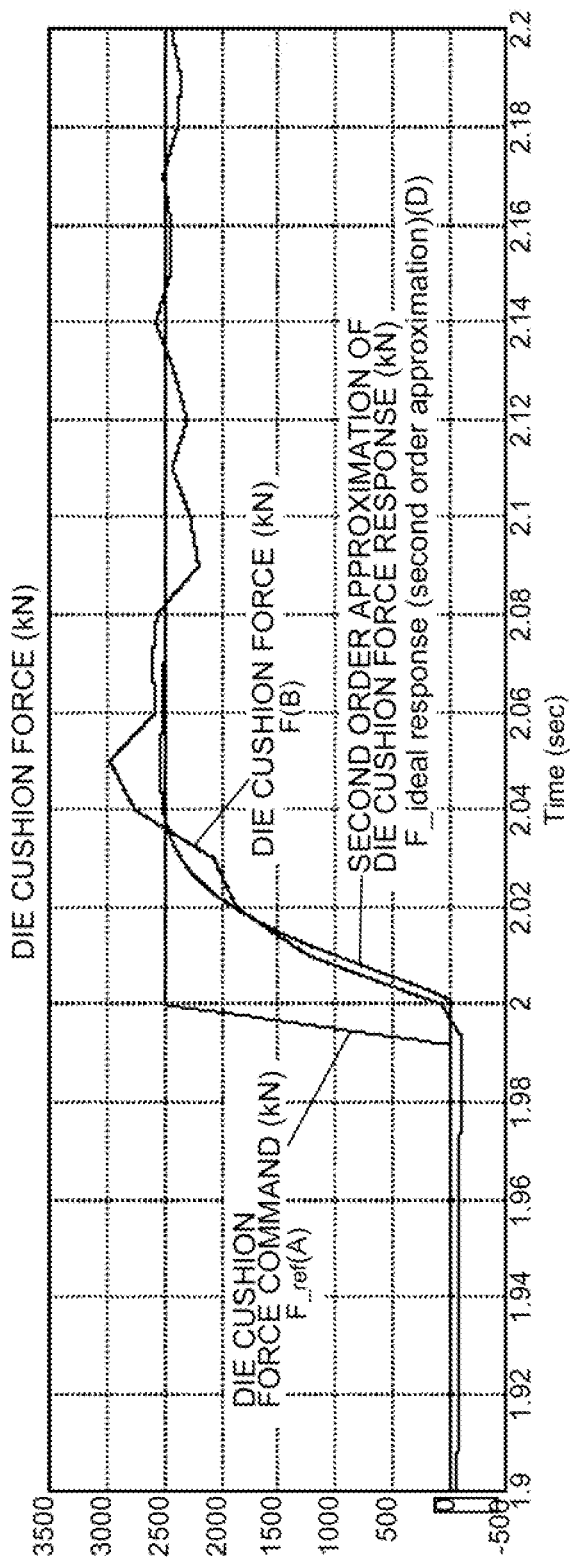
FIG. 10 is a waveform chart used to describe an ideal response of a die cushion force.

Originally, a stable ideal response without any overshoot or undershoot exemplified by F_ideal response (second order approximation) (D) shown in FIG. 10 is desirable.

Figure 11:
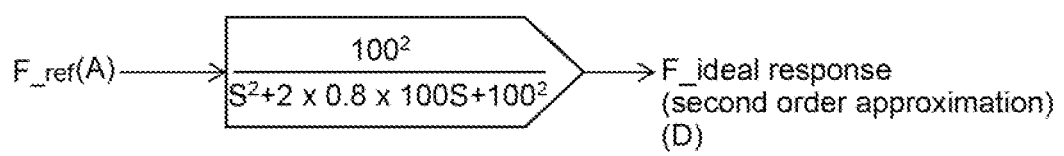
FIG. 11 is a diagram showing a transfer function which ideally (unrealistically) approximates an actual response by a second order delay element.

FIG. 11 shows a transfer function which ideally (unrealistically) approximates an actual response F (B) by a second order delay element. F_ideal response (D) provided by the transfer function is expressed (hypothetically) by the second order delay element, which has (comparable, realistic) responsiveness, along the actual response F (B) as shown in FIG. 10, where natural angular frequency $\omega_p$ is assumed to be 100 rad/s while the damping ratio $\zeta_p$ is assumed to be 0.8 to improve stability.

However, a constant stepwise command value F_ref(A), which responds according to the transfer function shown in FIG. 8B, can provides only a response result of F_approximation (C) shown in FIG. 9B. Thus, an ideal die cushion force command value ($F_{ref}$_ideal (E)) which provides F_ideal response (D) is computed, and the computed die cushion force command value ($F_{ref}$_ideal (E)) is given as a command value instead of the constant stepwise command value (F_ref (A)).

The ideal die cushion force command value ($F_{ref}$_ideal (E)) can be calculated from F_ideal response (D) and the inverse characteristic of the response characteristic because the response characteristic exhibited in the period between the output of the die cushion force command value and the generation of the die cushion force is nearly constant under the conditions described above and the inverse characteristic in the period between the generation of the die cushion force and the output of the die cushion force command value is also nearly constant.

The inverse characteristic of the response characteristic can be determined through an arithmetic operation. It is theoretically impossible to find an exact solution to the inverse characteristic of the second order delay element, but an approximate solution can be found. The inverse characteristic of the second order delay element includes a differentiating element of the second order delay element and, so to say, is a second order lead module.

Figure 12:
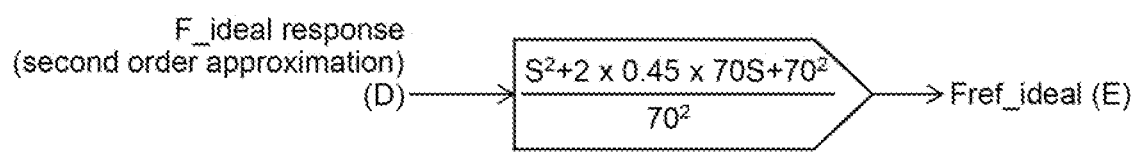
FIG. 12 is a diagram showing a transfer function of an inverse characteristic from a die cushion force to a die cushion force command value.
Figure 13:
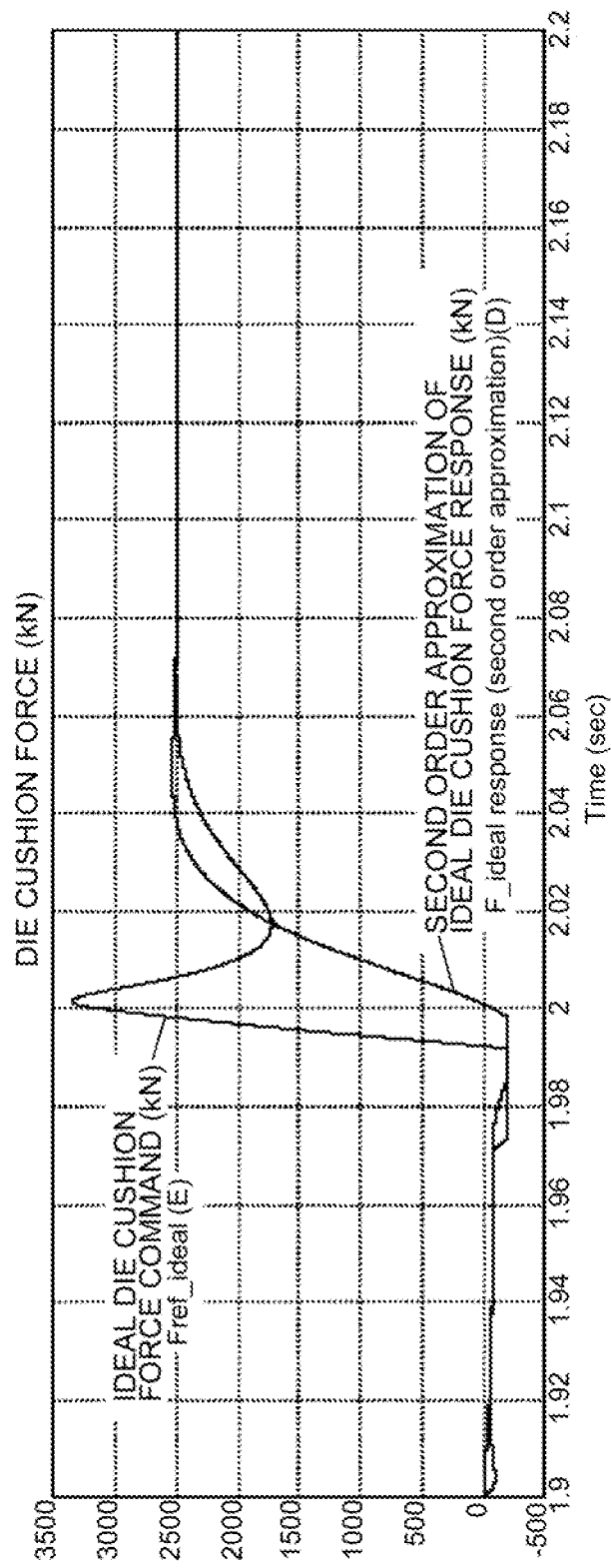
FIG. 13 is a waveform chart of an ideal die cushion force command value showing a response result (result of an arithmetic operation) obtained when a die cushion force with an ideal response is given to an inverse characteristic.

FIG. 12 shows an inverse characteristic from a die cushion force to a die cushion force command value (transfer function from F_ideal response (D) to $F_{ref}$_deal (E)) while FIG. 13 shows a result of the response (result of an arithmetic operation).

Therefore, when the ideal die cushion force command value ($F_{ref}$_ideal (E)) thus found is given, a die cushion force (F_ideal response (D)) with a smooth ideal response can be obtained (returned).

The die cushion force command value and the die cushion force response to the die cushion force command value shown in FIG. 5B are experimental results (first embodiment) obtained by giving (setting) the ideal die cushion force command value ($F_{ref}$_ideal (E)) of FIG. 13 approximated through gradual changes. As shown in FIG. 5B, the die cushion force response to the ideal die cushion force command value is a smooth die cushion force response with suppressed overshoots and undershoots compared to the die cushion force response shown in FIG. 3B.

The die cushion force command value and the die cushion force response to the die cushion force command value shown in FIG. 7B are experimental results (second embodiment) obtained by giving the ideal die cushion force command value ($F_{ref}$_ideal (E)) in FIG. 13 in a more simplified form (approximating an incremental command value) than an approximation as gradual changes. A similarly smooth die cushion force is obtained. The experimental results demonstrate the validity of the "principles on which vibration of die cushion force at the time of impact is suppressed."

[First Embodiment of Die Cushion Force Command Device]

Next, a first embodiment of a die cushion force command device applicable to the die cushion apparatus according to the present invention will be described.

Figure 14:
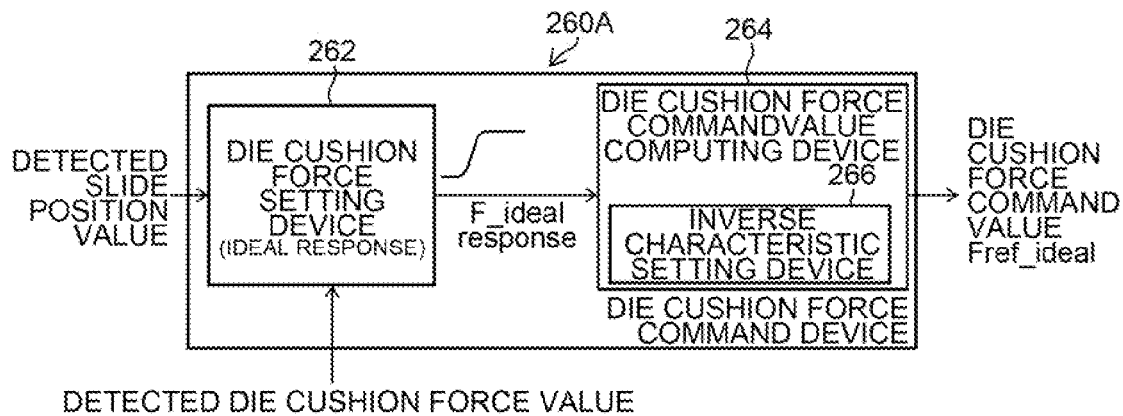
FIG. 14 is a block diagram showing a first embodiment of a die cushion force command device.

FIG. 14 is a block diagram showing the first embodiment of the die cushion force command device.

The die cushion force command device 260A shown in FIG. 14 is applicable as the die cushion force command device 260) shown in FIG. 1 and mainly includes a die cushion force setting device 262 and die cushion force command value computing device 264.

The die cushion force setting device 262 has been preset with a response waveform which represents a die cushion force (F_ideal response (D)) with an ideal response shown in FIG. 10 and designed to output a die cushion force command value (F_ideal response (D)) corresponding to the slide position to the die cushion force command value computing device 264 according to a detected slide position value which represents the slide position between a position at the time of impact of the slide against the die cushion and a bottom dead center.

The die cushion force command value computing device 264 includes an inverse characteristic setting device 266 and computes the ideal die cushion force command value ($F_{ref\_}$ideal (E)) shown in FIG. 13 based on the inputted die cushion force command value (F_ideal response (D)) and on an inverse characteristic (inverse characteristic of a response characteristic exhibited in a period between output of a die cushion force command value and generation of a die cushion force) set on the inverse characteristic setting device 266.

The die cushion force with an ideal response set on the die cushion force setting device 262 is not limited to the die cushion force (F_ideal response (D)) shown in FIG. 10, and a stable die cushion force which approximates an actual response and which is free of any overshoot or undershoot may be set automatically or manually based on the detected die cushion force value.

Figure 15:
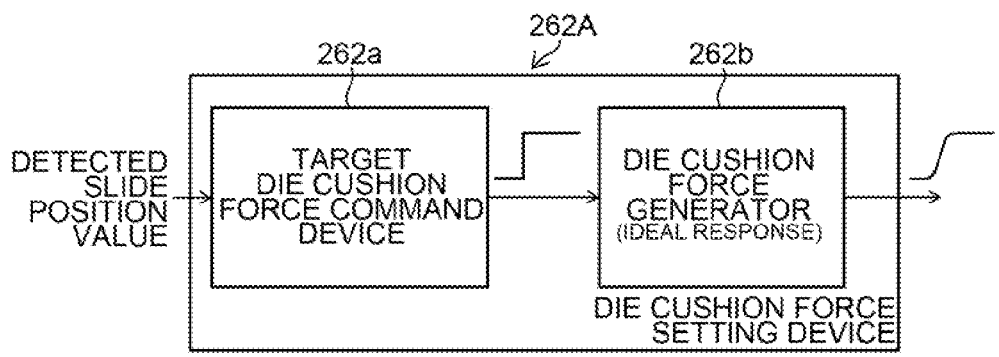
FIG. 15 is a block diagram showing an example of a die cushion force setting device.

The die cushion force setting device 262 can be configured as a die cushion force setting device 262A shown in FIG. 15.

The die cushion force setting device 262A includes a target die cushion force command device 262a and a die cushion force generator 262b.

A smooth die cushion force command value (die cushion force command value set before) indicating a targeted die cushion force is set on the target die cushion force command device 262a and the target die cushion force command device 262a outputs a target die cushion force command value corresponding to the slide position according to a detected slide position value.

For example, a transfer function shown in FIG. 11 is set on the die cushion force generator 262b and the die cushion force generator 262b computes (by conversion) the die cushion force (F_ideal response (D)) with an ideal response based on the inputted target die cushion force command value and set transfer function.

Figure 16:
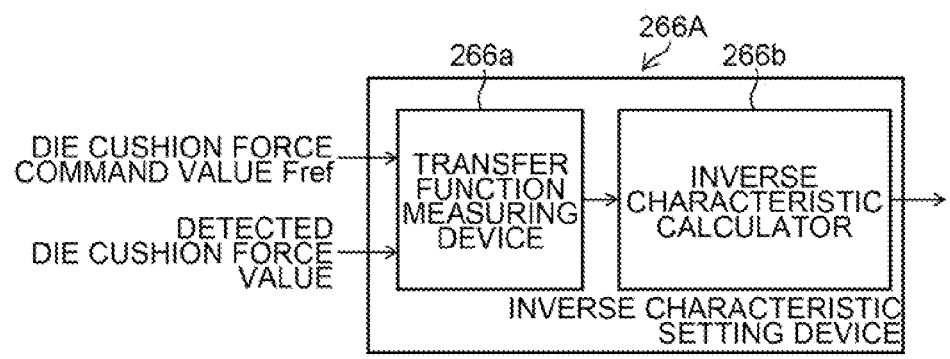
FIG. 16 is a block diagram showing an example of an inverse characteristic setting device.

The inverse characteristic setting device 266 shown in FIG. 14 can be configured as an inverse characteristic setting device 266A shown in FIG. 16.

The inverse characteristic setting device 266A includes a transfer function measuring device 266a and an inverse characteristic calculator 266b.

The transfer function measuring device 266a, which is supplied with a die cushion force command value $F_{ref}$ as well as with a detected die cushion force value which represents a result of response to the die cushion force command value Fmr, identifies a response characteristic exhibited in a period between output of the die cushion force command value $F_{ref}$ and output of the detected die cushion force value using a transfer function (a transfer function of a second order delay element, in the present example), based on the input values. From the transfer function measured by transfer function measuring device 266a, the inverse characteristic calculator 266b calculates the inverse characteristic of the transfer function by arithmetic operation.

The inverse characteristic setting device 266A may calculate and set the inverse characteristic based on the die cushion force command value $F_{ref}$ issued during a trial pressing period and on a detected die cushion force value which represents a result of response to the die cushion force command value $F_{ref}$ or calculate and set the inverse characteristic based on die cushion force command values issued during a working period made up of one or more normal press cycles and on detected die cushion force values which represent results of response to the die cushion force command values. When using plural detected die cushion force values corresponding to plural die cushion force command values issued during a working period made up of plural press cycles, it is preferable to use an average value of the plural detected die cushion force values. Also, the inverse characteristic may be calculated and updated on each press cycle.

Also, the response characteristic exhibited in the period between the output of the die cushion force command value and the generation of the die cushion force is nearly constant as long as load conditions (die, blank, slide velocity, die cushion force settings, degree of pre-acceleration for causing the cushion pad to start descending just before an impact, and the like) are constant, but changes with changes in the load conditions. Therefore, before changing load conditions, it is necessary to calculate the inverse characteristic of the response characteristic anew and set the calculated inverse characteristic.

[Second Embodiment of Die Cushion Force Command Device]

Next, a second embodiment of the die cushion force command device applicable to the die cushion apparatus according to the present invention will be described.

FIG. 17 is a block diagram showing the second embodiment of the die cushion force command device.

The die cushion force command device 260B shown in FIG. 17 is applicable as the die cushion force command device 260 shown in FIG. 1 and includes a die cushion force setting device 268a, a slide position setting device 268b, and a time setting device 268c as manually-operated setting devices.

Also, the die cushion force command device 260B has a function to display the ideal die cushion force command value ($F_{ref\_}$ideal (E)) shown in FIG. 13 on a display device 269. Note that in order to display the die cushion force command value ($F_{ref\_}$ideal (E)) on the display device 269, it is sufficient to have the capability of the die cushion force command device 260A shown in FIG. 14 to output the die cushion force command value ($F_{ref\_}$ideal (E)). Also, in the present example, a graph showing a relationship between the slide position X and die cushion force F is displayed on the display device 269 as shown in FIG. 17, allowing the operator to understand what type of die cushion force command value to set in manually setting an ideal die cushion force command value.

By referring to a die cushion force command value ($F_{ref\_}$ideal (E)) displayed on the display device 269, the operator can set each setting item needed to specify an ideal die cushion force command value using the die cushion force setting device 268a, slide position setting device 268b, and time setting device 268c.

That is, in order to suppress vibration of the die cushion force at the time of impact between the slide and cushion pad, which is a purpose of the present application, the operator can set force changing portions (first target die cushion force setting portions) from the time of impact to the time of target die cushion force setting and set subsequent force changing portions (second target die cushion force setting portions) (for the purpose of improving original formability) by setting the die cushion force command values (F1, F2. F3, F4, F5, . . . ) for the respective slide positions (X1, X2, X3, X4, X5, . . . ). The setting items for the first target die cushion force setting portions include the die cushion force command values (F1, F2, and F3) and slide positions (X1, X2, and X3) while the setting items for the second target die cushion force setting portion include the die cushion force command values (F4, F5, . . . ) and slide positions (X4, X5, . . . ).

The first target die cushion force setting portions are set by manually setting the die cushion force command values F1 to F3, respectively, shown in FIGS. 4 and 6 using the die cushion force setting device 268a and by manually setting the slide positions X1 to X3, respectively, shown in FIGS. 4 and 6 using the slide position setting device 268b.

The die cushion force command value F1 is a command value at the start of die cushion force control (at the time of slide impact) and is equal to or larger than the target die cushion force command value (die cushion force command value F3). The die cushion force command value F2 is set to be smaller than the target die cushion force command value to suppress the die cushion force overshoot occurring just after the impact. Also, the slide positions X1 to X3 correspond to change points of the die cushion force command values F1 to F3.

When setting the above-mentioned first target die cushion force setting portions, the operator can set the die cushion force command values F1 to F3 and slide positions X1 to X3 by understanding what level of die cushion force to apply and at which slide position with reference to the ideal die cushion force command value for use during a period from impact to setting of the first target die cushion force, the ideal die cushion force command value being displayed on the display device 269.

On the other hand, the second target die cushion force setting portions are set by manually setting the die cushion force command values F4, F5, . . . , respectively, using the die cushion force setting device 268a and by manually setting the slide positions X4, X5, . . . , respectively, using the slide position setting device 268b.

Since the ideal die cushion force command values in the above-mentioned first target die cushion force setting portions suppress vibration such as the die cushion force overshoot occurring just after the impact, the subsequent die cushion force command values in the second target die cushion force setting portions can be set to desired command values intended to improve formability. Although die cushion forces different from the initial target die cushion forces are set as command values in the second target die cushion force setting portions, this does not cause a vibration problem because no impact is involved.

Although the first target die cushion force setting portions (die cushion force command values F1 to F3 and slide positions X1 to X3) are set using the die cushion force setting device 268a and slide position setting device 268b in the above example, instead of setting the slide positions X1 to X3 using the slide position setting device 268b, the operator can manually set each of the time periods T1 and T2 shown in FIGS. 4 and 6 using the time setting device 268c. These time periods T1 and T2 exist between respective pairs of the change points of the die cushion force command values F1 to F3. Regarding the second target die cushion force setting portions, similarly, time periods T3, T4, . . . can be set instead of the slide positions X4, X5, . . . .

In setting the first target die cushion force setting portions using the die cushion force setting device 268a and time setting device 268c as described above, preferably a graph showing a relationship between the time period from the time of slide impact and the ideal die cushion force F is displayed on the display device 269.

Once setting items are set by the die cushion force setting device 268a, the slide position setting device 268b, or time setting device 268c, including the setting items (die cushion force command values F1, F2, and F3; slide positions X1, X2, and X3; or time periods T1 and T2) used to specify the die cushion force command values intended to suppress vibration of the die cushion force at the time of impact as well as the setting items (die cushion force command values F4, F5, . . . ; slide positions X4, X5, . . . . or time periods T3, T4, . . . ) used to specify die cushion force command values for the purpose of improving original formability, the die cushion force command device 260B outputs a die cushion force command value which changes continuously (gradually) or a die cushion force command value which changes incrementally, using the above-mentioned setting items based on a detected slide position value.

If the time periods T1, T2, . . . from the time of slide impact are set, the die cushion force command device 260B outputs a die cushion force command value which changes continuously or incrementally, depending on the time period from the time of slide impact.

Also, although the die cushion force command device 260B displays the ideal die cushion force command value ($F_{ref\_}$ideal (E)) shown in FIG. 13 on the display device 269, a continuous or incremental waveform which approximates the die cushion force command value ($F_{ref\_}$ideal (E)) may be displayed. Furthermore, not only a waveform which represents an ideal die cushion force command value, but also numeric values may be displayed. Also, instead of displaying (outputting) the die cushion force command value on the display device 269, the die cushion force command value may be printed out by a printer (not shown).

Also, the slide position setting device 268b described above allows the operator to adjust, as appropriate, values of various setting items used to specify an ideal die cushion force command value while checking the detected die cushion force value which is a result of response to the die cushion force command value.

[Others]

Although in the above embodiments, the response characteristic exhibited in the period between the output of a die cushion force command value and the generation of a die cushion force is identified using the transfer function of a second order delay element, and the inverse characteristic of the response characteristic is determined, the transfer function is not limited to the transfer function of a second order delay element. For example, a transfer function of a first order delay element, the product of a second order delay element and first order delay element, the product of a second order delay element and another second order delay element (differing in angular natural frequency and damping ratio) may be used for identification.

Also, although the die cushion force generator according to the above embodiments is made up of a hydraulic cylinder adapted to move the cushion pad up and down and a hydraulic motor and servomotor adapted to drive the hydraulic cylinder, this is not restrictive, and as long as a die cushion force is generated, the die cushion force generator may be made up mainly of, for example, a screw and nut mechanism adapted to move the cushion pad up and down, a servomotor adapted to drive the screw and nut mechanism, and a mechanism using a hydraulic damper; or a rack and pinion mechanism adapted to move the cushion pad up and down, a servomotor adapted to drive the rack and pinion mechanism, and a mechanism using a hydraulic damper.

Furthermore, the present invention is not limited to the embodiments described above, and needless to say, various changes can be made without departing from the spirit and scope of the present invention.

What is claimed is:

1. A die cushion force control method that outputs a predetermined die cushion force command value and generates a die cushion force on a cushion pad based on the die cushion force command value, the die cushion force control method comprising:
   initially outputting a die cushion force command value equal to or larger than a target die cushion force command value in order to suppress an initial die cushion force overshoot generated when the target die cushion force command value configured to be stepwise is used as the die cushion force command value;
   then outputting a die cushion force command value decreased continuously or stepwise to be smaller than the target die cushion force command value; and
   subsequently outputting a die cushion force command value increasing continuously or stepwise to be equal to the target die cushion force command value.

2. The die cushion force control method according to claim 1, comprising:
   a step of outputting a first die cushion force command value as the die cushion force command value during a first press working period of a press machine;
   a step of detecting a first die cushion force generated on the cushion pad controlled based on the outputted first die cushion force command value;
   a step of computing an inverse characteristic of a response characteristic exhibited in a period between output of the first die cushion force command value and generation of the first die cushion force based on the outputted first die cushion force command value and the detected first die cushion force;
   a step of setting a second die cushion force with an ideal response represented by a waveform free of any overshoot or undershoot;
   a step of calculating a second die cushion force command value based on the die cushion force with the ideal response and on the inverse characteristic; and
   a step of outputting the calculated second die cushion force command value as the die cushion force command value during a second press working period after a lapse of the first press working period of the press machine.

3. The die cushion force control method according to claim 2, wherein the step of computing an inverse characteristic includes:
   a step of identifying the response characteristic exhibited in the period between the output of the first die cushion force command value and the generation of the first die cushion force using a transfer function based on the outputted first die cushion force command value and the detected first die cushion force; and
   a step of computing an inverse characteristic of the identified transfer function.

4. The die cushion force control method according to claim 2, wherein the second die cushion force with the ideal response approximates the detected first die cushion force and is represented by a waveform free of any overshoot or undershoot contained in the first die cushion force.

5. The die cushion force control method according to claim 2, wherein the first press working period of the press machine is a trial pressing period or a working period made up of one or more press cycles.

6. A die cushion apparatus comprising:
   a die cushion force generator which supports a cushion pad and generates a die cushion force on the cushion pad;
   a die cushion force command device which outputs a die cushion force command value; and
   a die cushion force controller which controls the die cushion force generator to generate the die cushion force corresponding to the die cushion force command value, based on the die cushion force command value outputted from the die cushion force command device, wherein
   the die cushion force command device initially outputs a die cushion force command value equal to or larger than a target die cushion force command value in order to suppress an initial die cushion force overshoot generated when the target die cushion force command value configured to be stepwise is used as the die cushion force command value, then outputs a die cushion force command value decreased continuously or stepwise to be smaller than the target die cushion force command value, and subsequently outputs a die cushion force command value increasing continuously or stepwise to be equal to the target die cushion force command value.

7. The die cushion apparatus according to claim 6, wherein the die cushion force command device includes a manually-operated setting device used to manually set a plurality of setting items in order to specify the die cushion force command value, and outputs the die cushion force command value based on the plurality of setting items specified via the manually-operated setting device.

8. The die cushion apparatus according to claim 7, wherein:
   the plurality of setting items set via the manually-operated setting device include a first die cushion force command value equal to or larger than the target die cushion force command value, a second die cushion force command value smaller than the target die cushion force command value, and a third die cushion force command value which represents the target die cushion force command value, and first, second, and third slide positions which represent positions of a slide of a press machine at respective output times of the first, second, and third die cushion force command values, or a first time period during which the die cushion force command value is decreased continuously from the first die cushion force command value to the second die cushion force command value, the first time period beginning at a rise time of the first die cushion force command value and a second time period during which the die cushion force command value is increased continuously from the second die cushion force command value to the third die cushion force command value; and
   the die cushion force command device outputs a die cushion force command value which changes continuously based on the first, second, and third die cushion force command values, and the first, second, and third slide positions, or the first time period and the second time period from a time of slide impact set via the manually-operated setting device.

9. The die cushion apparatus according to claim 7, wherein the plurality of setting items set via the manually-operated setting device include a first die cushion force command value equal to or larger than the target die cushion force command value, a second die cushion force command value smaller than the target die cushion force command value, and a third die cushion force command value which represents the target die cushion force command value, and first, second, and third slide positions which represent positions of a slide of a press machine at a rise time of the first die cushion force command value, a fall time of the second die cushion force command value, and a rise time of the third die cushion force command value, respectively, or a first time period which represents an output period of the first die cushion force command value and a second time period which represents an output period of the second die cushion force command value; and the die cushion force command device outputs a die cushion force command value which changes stepwise, based on the first, second, and third die cushion force command values, and the first, second, and third slide positions, or the first time period and the second time period from a time of slide impact set via the manually-operated setting device.

10. The die cushion apparatus according to claim 7, further comprising:

a die cushion force setting device which sets a die cushion force with an ideal response represented by a waveform free of any overshoot or undershoot;

an inverse characteristic setting device which sets an inverse characteristic of a response characteristic exhibited in a period between output of the die cushion force command value and generation of the die cushion force; and an output device which outputs a value computed based on the die cushion force with an ideal response set on the die cushion force setting device and the inverse characteristic set on the inverse characteristic setting device, or outputs a waveform or a numeric value which represents an approximate value of the computed value, the output device outputting the computed value or the waveform or numeric value in visible form as a die cushion force command value to be set on the die cushion force command device.

11. The die cushion apparatus according to claim 10, further comprising:

a die cushion force sensor which detects the die cushion force generated on the cushion pad, based on the die cushion force command value outputted from the die cushion force command device;

a transfer function measuring device which measures a transfer function which represents the response characteristic exhibited in the period between the output of the die cushion force command value and the generation of the die cushion force, based on the outputted die cushion force command value and the detected die cushion force; and an inverse characteristic calculator which calculates an inverse characteristic of the measured transfer function, wherein the inverse characteristic calculated by the inverse characteristic calculator is automatically set on the inverse characteristic setting device.

12. The die cushion apparatus according to claim 6, further comprising:

a die cushion force setting device which sets a die cushion force with an ideal response represented by a waveform free of any overshoot or undershoot; and an inverse characteristic setting device which sets an inverse characteristic of a response characteristic exhibited in a period between output of the die cushion force command value and generation of the die cushion force, wherein the die cushion force command device outputs a value computed based on the set die cushion force with an ideal response and on the set inverse characteristic, or outputs an approximate value of the computed value as a die cushion force command value.

13. The die cushion apparatus according to claim 12, further comprising:

a target die cushion force setting device which sets a stepwise target die cushion force command value; and a die cushion force generator which generates a die cushion force with an ideal response based on the set target die cushion force command value, wherein the die cushion force with an ideal response generated by the die cushion force generator is set on the die cushion force setting device.

14. The die cushion apparatus according to claim 12, further comprising:

a die cushion force sensor which detects the die cushion force generated on the cushion pad, based on the die cushion force command value outputted from the die cushion force command device, wherein the die cushion force setting device automatically sets a die cushion force which approximates the die cushion force detected by the die cushion force sensor and which is represented by a waveform free of at least an initial overshoot or an initial undershoot, as a die cushion force with an ideal response.

* * * * *